(12) United States Patent
Chen

(10) Patent No.: US 10,191,541 B2
(45) Date of Patent: Jan. 29, 2019

(54) AUGMENTING VIRTUAL REALITY CONTENT WITH REAL WORLD CONTENT

(71) Applicant: Sony Interactive Entertainment Inc., Tokyo (JP)

(72) Inventor: Ruxin Chen, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 41 days.

(21) Appl. No.: 15/385,794

(22) Filed: Dec. 20, 2016

(65) Prior Publication Data

US 2018/0004286 A1    Jan. 4, 2018

Related U.S. Application Data

(60) Provisional application No. 62/357,323, filed on Jun. 30, 2016.

(51) Int. Cl.
| | | |
|---|---|---|
| *G06F 3/01* | (2006.01) | |
| *G02B 27/01* | (2006.01) | |
| *G06T 11/60* | (2006.01) | |
| *G09G 5/36* | (2006.01) | |
| *G06F 3/03* | (2006.01) | |
| *G06F 3/0481* | (2013.01) | |
| *G06F 3/0346* | (2013.01) | |

(52) U.S. Cl.
CPC ........... *G06F 3/013* (2013.01); *G02B 27/017* (2013.01); *G06F 3/011* (2013.01); *G06F 3/012* (2013.01); *G06F 3/0304* (2013.01); *G06F 3/0346* (2013.01); *G06F 3/0481* (2013.01); *G06T 11/60* (2013.01); *G09G 5/363* (2013.01); *G09G 2340/12* (2013.01); *G09G 2354/00* (2013.01)

(58) Field of Classification Search
CPC ....... G06F 3/013; G02B 27/017; G06T 11/60; G09G 5/363; G09G 2340/12; G09G 2354/00
See application file for complete search history.

(56) References Cited

U.S. PATENT DOCUMENTS

| | | | |
|---|---|---|---|
| 2013/0113973 A1* | 5/2013 | Miao | G09G 3/003 348/333.01 |
| 2014/0361976 A1 | 12/2014 | Osman et al. | |
| 2014/0364212 A1 | 12/2014 | Osman et al. | |
| 2018/0024624 A1* | 1/2018 | Gentilin | G06F 3/012 |
| 2018/0024625 A1* | 1/2018 | Gentilin | G06F 3/012 |

OTHER PUBLICATIONS

International Search Report PCT/US2017/039594, dated Dec. 8, 2017, 4 pages.

* cited by examiner

*Primary Examiner* — Peter D McLoone
(74) *Attorney, Agent, or Firm* — Martine Penilla Group, LLP

(57) ABSTRACT

Methods, devices, and computer programs for augmenting a virtual reality scene with real world content are provided. One example method includes an operation for obtaining sensor data from an HMD of a user to determine that a criteria is met to overlay one or more real world objects into the virtual reality scene to provide an augmented virtual reality scene. In certain examples, the criteria corresponds to predetermined indicators suggestive of disorientation of a user when wearing the HMD and being presented a virtual reality scene. In certain other examples, the one or more real world objects are selected based on their effectiveness at reorienting a disoriented user.

20 Claims, 16 Drawing Sheets

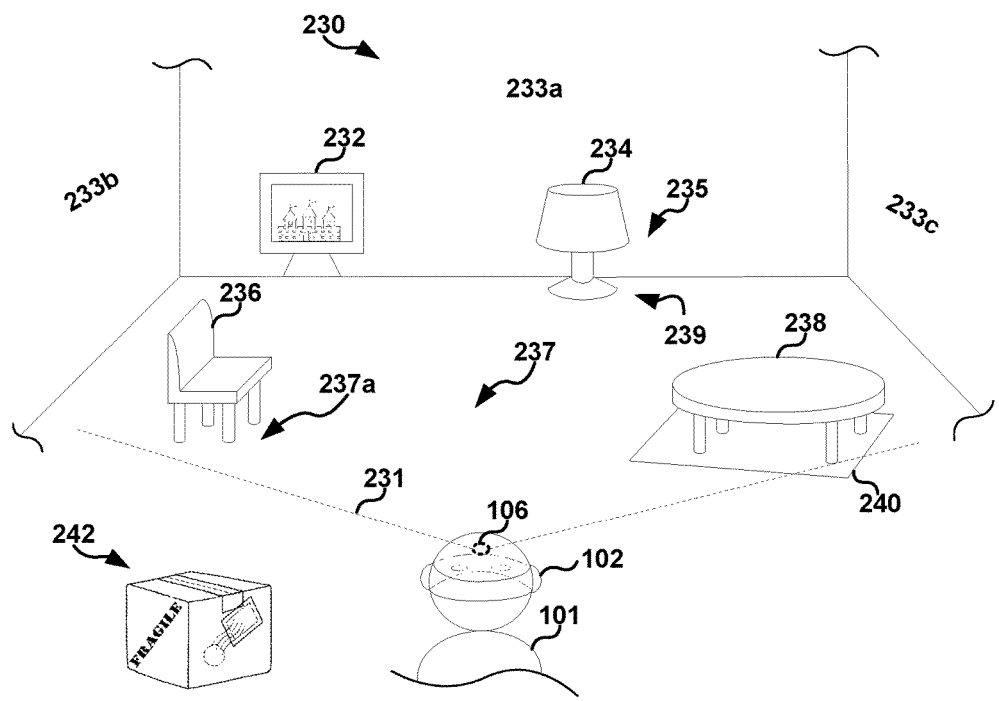
FIG. 5A
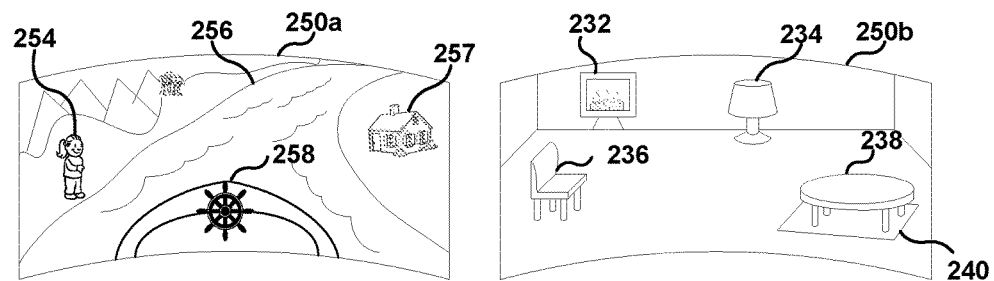
FIG. 5B
FIG. 5C

AUGMENTING VIRTUAL REALITY CONTENT WITH REAL WORLD CONTENT

CLAIM OF PRIORITY

This application is a non-provisional of U.S. Provisional Patent Application No. 62/357,323, filed on Jun. 30, 2016, entitled "Augmenting Virtual Reality Content With Real World Content," which is herein incorporated by reference.

FIELD OF THE INVENTION

The present invention relates to methods for changing virtual reality content, and more particularly, methods and systems for augmenting virtual reality content with real world content, and switching and blending content based on detected user interactivity.

BACKGROUND

Virtual reality (VR) is becoming more and more pervasive as a way for consumers to interact with content and as a way for content creators to interact with an audience. As the popularity of VR continues to grow, so does its level of intensity and immersion. It is not uncommon for virtual reality scenes (VRS) to cause disorientation in a viewer. The level of disorientation can range from mild discomfort to severe unpleasantness. As a result, disorientation is a concern from both a usability context as well as one of safety. For example, disorientation causes overall user experience to suffer and takes away from a VR experience. Moreover, the potential for user disorientation may restrict what content creators are willing to produce out of concern for preventing potentially disorienting scenes.

Thus, as VR immersiveness and intensity continues to grow, there are advantages to systems and methods that can provide measures to alleviate disorientation and/or discomfort they may cause.

It is in this context that embodiments of the invention arise.

SUMMARY

Embodiments of the present invention provide methods and systems for changing virtual reality scenes, and more particularly, for augmenting virtual reality scenes with real world content. The method and system also define embodiments for switching between VR content and real-world content, and managing transitions between the two. It should be appreciated that the present invention can be implemented in numerous ways, such as a process, an apparatus, a system, a device or a method on a computer readable medium. Several inventive embodiments of the present invention are described below.

In one embodiment, a method includes an operation for obtaining data from sensors on an HMD. Sensor data is processed to determine whether a first criteria is met to transition from a virtual reality scene (VRS) to an augmented VRS to be displayed on the HMD, wherein the first criteria corresponds to predetermined indicators suggestive of disorientation of a user when wearing the HMD and being presented the VRS. Once it is determined that the first criteria is met, the method includes an operation for inserting a first real world object into the VRS to produce an augmented VRS, where the first real world object is from a real world view provided by a camera disposed in a virtual reality interactive space. "Augmented VRS" or "augmented VR" in the context of these embodiments refer to VR that has been modified from an original state to include content from the real world. Augmented VR or VRS may also be referred to as a "hybrid view" or "hybrid HMD view."

In another embodiment, a system for providing VRS includes a process for obtaining sensor data from an HMD. The system also includes a processor that processes said data to determine whether a first criteria is met. The first criteria corresponds to predetermined indicators suggestive of disorientation of a user when wearing the HMD and being presented the VRS. The system further includes rendering components that insert a real world object into the VRS. The real world object is capture from a real world view provided by a camera disposed in the virtual reality interactive space.

In yet another embodiment, a computer program embedded in a non-transitory computer-readable storage medium, when executed by one or more processors, changes virtual reality content of an HMD. Included in the medium are program instructions for obtaining HMD sensor data and processing said data to determine that a first criteria is met, the first criteria corresponding to predetermined indicators that are suggestive of disorientation of a user when wearing the HMD and being presented the virtual reality scene. Further, the medium also includes program instructions for inserting a first real world object into the VRS, the first real world object being from a real world view provided by a camera in a virtual reality interactive space.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 5A shows a user in the real world wearing an HMD and being presented a VRS while situated in a room, according to one embodiment.

FIGS. 5B-5H show various views the user may be displayed with, including a VRS, an augmented VRS with one or more real world objects, and a real world view, according to some embodiments.

DETAILED DESCRIPTION

Figure 1:
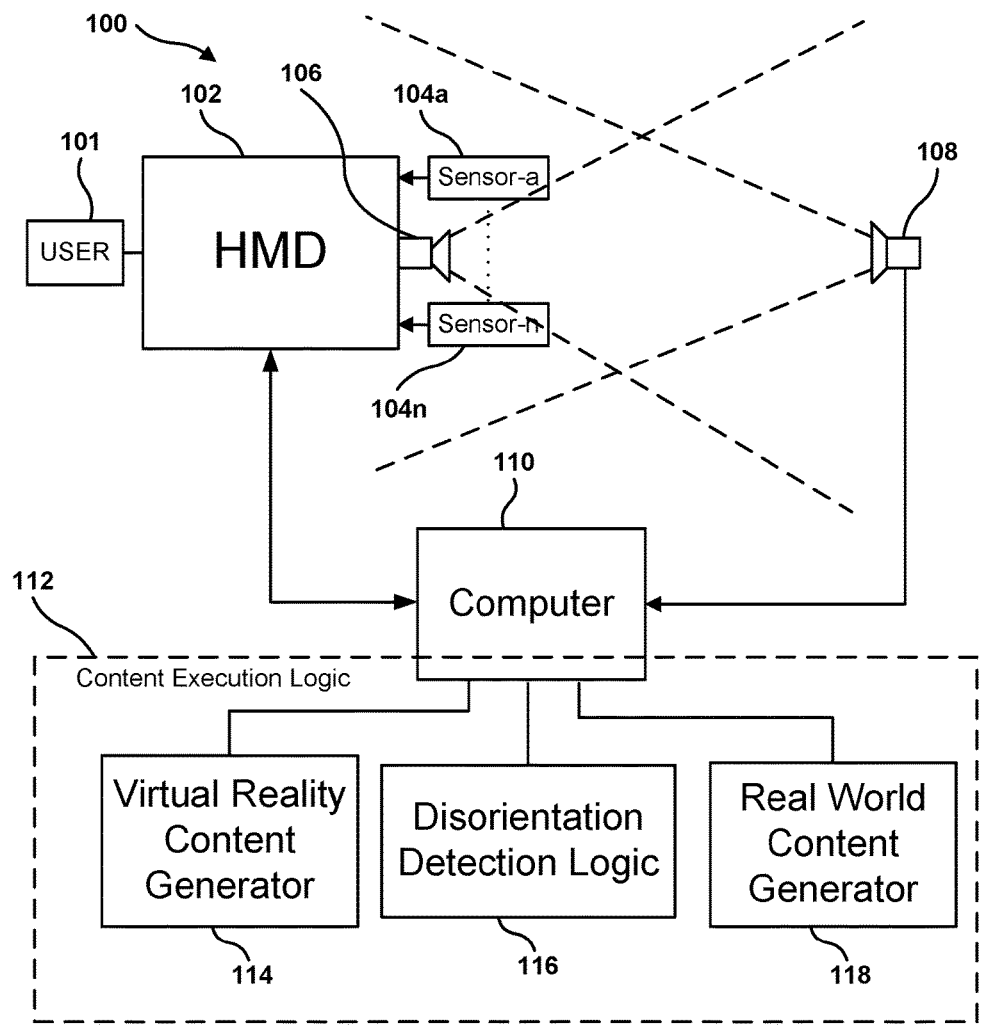
FIG. 1 illustrates an embodiment capable of providing a VRS to a user and augmenting the VRS.

The following embodiments describe methods, computer programs, and apparatus for changing a virtual reality scene displayed in a head mounted display (HMD). It will be obvious, however, to one skilled in the art, that the present invention may be practiced without some or all of these specific details. In other instances, well known process operations have not been described in detail in order not to unnecessarily obscure the present invention.

Virtual reality scenes provided by HMDs are often so immersive that they cause disorientation to some of their users. A user's disorientation may be characterized by losses to sense of balance, sense of grounding, sense of gravity, sense of position within a space, sense of safety, etc. Similarly, the user's experience of any one of these classes of disorientation may range from mild to severe. Not only do moments of disorientation take away from virtual reality scene experience, they may also prevent users from enjoying content or appreciating unique content.

Moreover, HMD users are often unaware of their own state of disorientation while fully engaged by a virtual reality scene (VRS). A user's disorientation may therefore continue to escalate unnoticed until the user feels it necessary to stop the VRS altogether. As a consequence, not only does the user undergo a substantial degree of disorientation, any progress made within the virtual reality scene may also be effectively lost. As a result, a technical need is present for enhancing experience as well as user safety by detecting user disorientation and assist in reorientation of the user in situ, especially as VRS experiences are being developed to become more accessible, immersive, and interactive. Additionally, it may be more computationally efficient to detect and rectify disorientation in situ rather than to restart the virtual reality scene at some earlier point.

As used herein, "in situ" means that the detection of disorientation is processed while the user is interacting with a VRS, and changes to the presentation of content are made dynamically during the interacting with the VRS. The changes, in one embodiment, include blending in real world objects into the VRS, and enabling a blending of real world objects until disorientation is reduced, and then switching back to the VRS. In some embodiments, the switching may occur to fully bring the view in the HMD to the real world until user reorientation is detected, and then progressively moving back into the VRS. In certain other embodiments, an overlay of a partial real world view may be provided on the HMD (e.g, overlaid onto a VRS) such that the user may be provided an opportunity to reorient.

Detecting user disorientation can be accomplished in a number of ways. When a user is disoriented, she may exhibit a number of physical cues that may be measured by sensors. For example, disoriented users might demonstrate erratic eye movements (e.g., nystagmus), abnormal head movements (e.g. tilt), posture (lean), gait, etc. Other accompanying physical symptoms may include sweating, fever, audible utterances, among others. These physical cues can be quantitatively measured and tracked by sensors in and on an HMD and elsewhere in the virtual reality interactive space. For example, inferred images of may be obtained from cameras located within the virtual reality interactive space. As used herein, "virtual reality interactive space" refers to the 3-dimensional real world space in which a user may be engaged in a VRS via an HMD.

Some of the above mentioned sensors may include gaze detecting cameras (or eye-tracking cameras), eye cameras, inertial sensors, photo-sensitive diodes (PSDs), front facing cameras, multiple cameras disposed around the HMD with image stitching, HMD-facing cameras, microphones, moisture sensors, thermometers, etc. In some embodiments, eye cameras may include cameras that are configured to detect eye shape, 3D geometry of eye states, eye curvature, eye size, or distortion. In other embodiments, eye cameras may track pupil shape. Look up tables may be used to reference prior eye states and correlate current eye states to an expected state of disorientation or discomfort.

Further examples of user behavior or symptoms that may be measured include user heartbeat pattern, brain waves, and user vocalizations. One skilled in the art will recognize that a number of well-known physiological and neurological sensors may be incorporated in order to detect corresponding patterns in human physicality. Some of these sensors, as non-limiting examples, may include electrocardiogram (EKG or ECG) monitors, electromyogram (EMG) monitors, electroencephalography (EEG) monitors, among other electrodiagnostics (EDX) sensors. Additional description of the types of sensors that may be included in certain embodiments can be found in U.S. patent application Ser. No. 12/963,594, entitled "BIOMETRIC INTERFACE FOR A HANDHELD DEVICE," which is hereby incorporated by reference.

Further still, some embodiments may include a 'hard' button, a virtual button, voice control, voice command, or other user input vehicle operable for the user to volunteer information on her state of disorientation and/or reorientation and to stop, slow, or otherwise transition out of VR content.

Data from these sensors may then be obtained by a computer, which can then implement a disorientation detection logic (DDL). As an example, a DDL may determine that certain criteria are met corresponding to predetermined indicators that are suggestive of disorientation of the user based on the obtained sensor data. Once such a determination is made, a reorienting of the user begins while still preserving the continuity and integrity of the VRS to an extent possible (in situ reorientation).

In certain embodiments, the DDL may have a learning and/or predictive component. For example, the DDL may receive input from a user history and adjust certain indicators suggestive of disorientation according to said user history. As a result, the DDL may 'learn' patterns of disorientation behavior associated with particular users and tune its logic accordingly. Furthermore, the DDL may receive input from a VRS contextual data source, which may provide contextual information on upcoming VRS. As a result, the DDL may be able to predict a future state of disorientation based on these inputs ahead of time, according to some embodiments. For example, in certain embodiments the DDL may allow for augmented VRS or in situ reorientation based on a predicted future state of disorientation. Aspects of these embodiments are described in more detail below.

One way of reorienting the user while still preserving the continuity of a VRS involves selecting an object from the real world and inserting an image of that object into the VRS. In this embodiment, the inserted image of the real world object (RWO) may provide the user with a sense of grounding and spatial familiarity. As a result, the user may be reoriented without disrupting VRS progress. Real world objects may be captured by a camera within the virtual reality interactive space such as a front facing camera of the HMD, or multiple outward facing cameras of the HMD, or one or more cameras directed toward the user wearing the HMD.

Generally, a classifier of real world objects may be used to detect and identify objects from the above mentioned cameras. One example classifier uses a database and update engine to categorize identified objects. Using a classifier, it is possible to enable fast identification of real world objects. In some embodiments, the update engine can update its database by accessing other databases, either locally or over the Internet. The update engine may enable, for example, comparison of images to identify objects to databases of images, which can quickly render information about the objects. The information can include data that generally identifies the object, e.g., "a chair" or can also include more detailed data (e.g., metadata).

The detailed data, for instance, can identify the object as associated with a trademark, e.g., CocaCola™, can identify a shape, can identify a color, can identify three-dimensional shapes, can identify bar codes (2D and 3D), can identify sounds, and combinations of two or more thereof. In some embodiments, the classifier can identify individual objects, such as a coffee table or lamp situated within the virtual reality interactive space (e.g., the "real-world" in which the user is wearing an HMD, as captured by one or more cameras). As a further example, the classifier may be able to identify a floor and a wall and the points at which the two meet.

The classifier can also identify and categorize dimensions, relative dimensions, user generated content (UGC), user tag data, user comments, social media feeds, user reviews, etc. In other embodiments, classifiers can be trained using deep learning neural networks. Such networks may rely on data provided by specific data, as well as data received from many users. As noted, classifier systems are preferably optimized to identify objects that may be captured by cameras and/or other sensors. Processing one or more classifier, therefore, optimizes the speed and efficiency of object recognition and uses of such information.

Depending on the classes and intensities of disorientation, a selection module within the computer's content execution logic may also select a RWO based on an expected effectiveness of said RWO at alleviating a specific case of disorientation and/or user settings and user history. Once a real world object is selected, a RWO insertion logic and rendering module may then augment the VRS with the selected RWO to produce an augmented VRS. It should be noted that "augmented VRS" in this context refers to a VRS that has been augmented with real world content. Additionally, "augmentation" in this context refers to inserting, overlaying, blending, stitching, superimposing or otherwise adding content into an original scene.

Generally speaking, the RWO insertion logic may insert a RWO at a location within the VRS that corresponds to its location in the real world relative to the user's direction of gaze in real-time. As a result, the user sees the RWO within the augmented VRS as she would by taking off the HMD, providing her with spatial familiarity and reorientation cues without disrupting the flow of the VRS. Nevertheless, there may be certain instances where the insertion logic may place a RWO at a location within the VRS different than its location within the real world.

The process of augmenting the VRS can continue progressively with the insertion or blending or overlaying of additional real world objects until the computer's DDL determines that the user no longer meets the criteria indicative of disorientation. In one embodiment, the computer's content execution logic may remove the one or more inserted RWO(s) from the augmented VRS (e.g., at the same time or progressively). On the other hand, if the user does not reorient to an appropriate degree in response to augmented VRS, the DDL may determine that a second criteria is met.

In certain embodiments, a progressive integration of a real world object may include expanding a visible portion of a RWO that has already been inserted. For example, if a first RWO is first augmented into the VRS, additional RWOs may include a fuller or more expanded view of said first RWO. In other words, additional RWOs need not be discrete objects in the real world per se, but any portion of the real world view that is able to be captured by one or more cameras on the HMD and within the VR interactive space and introduced into the VR scene. In one example, the RWO may include several objects within the real world. In some examples, the real world object that is inserted, or blended, or overlaid onto a virtual reality scene may include a full or partial section of a real world surrounding. In other examples, the VR may be switched to an augmented reality having a real world view while retaining some virtual objects. In still other examples, a silhouette, outline, shadow, or outer portion of an image of an object may be used for blending with the VRS instead of or in addition to a more complete view of the object.

The second criteria, much like the first, also correspond to predetermined indicators suggestive of disorientation. However, while fulfillment of the first criteria may begin a process of augmented VRS, fulfillment of the second criteria may begin a full switch to a real world view (RWV). The switching from VRS to RWV may be accomplished by a VRS to RWV switching logic. Consequently, the user is completely deprived of disorienting stimuli (from the VRS) and given an opportunity to reorient to the real world view. Once the DDL determines that neither criteria are met, the VRS may resume its course, either where the switching occurred or at an earlier point. In this fashion, an HMD user is given an opportunity to reorient in situ with minimal interference to the VRS.

It should also be noted that certain embodiments may have virtual reality displays that include a first region that is a primary area of view and a second region that is a border or edge area of view. The first region may include a virtual reality view. The second region of the displays may include a blend of real world content with virtual reality content. The first region may be configured be in a primary (e.g., looking 'straight ahead') area of the displays for each of the left and right eyes such that if a user is to look 'straight ahead,' his gaze would fall on the first region. The second region may be configured to be in a more peripheral area or edge or border of the displays for the left and right eye such that the user's gaze would fall on the second region if the user were to gaze toward a peripheral direction (e.g., up/down, left right, corners of view). As a result, according to certain embodiments, the user may voluntarily switch between a virtual reality scene and a mixed scene with both virtual reality content and real world content by changing his gaze direction (e.g., from looking straight ahead to looking toward a bottom right corner of his view). That is, the user is enabled to consistently view some degree of a real world view by looking towards the second region or even by using his peripheral vision to keep track of the second region of the display.

In some embodiments, the second region may maintain a blend of real world content into a virtual world view over a period of time. In these and other embodiments, the user is continually given a view of the real world via the second region. In other embodiments, the second region may be toggled on an off, or may have varying degrees of blending of real world content into virtual content based on user preference settings.

It should be noted that while some embodiments may include a similar extent of real world content being blended into VR content for each of the left eye and right eye displays (for the left and right eyes, respectively), there are certain other embodiments in which a left eye or right eye display may have a greater or lesser extent of real world content being blended into the VR content than the other. For example, in certain embodiments, a left eye display may have more real world content blended into the VR scene that a right eye display. The opposite could be true as well, wherein a right eye display is provided with a greater degree of real world content augmentation into the virtual content than the left eye display. In this manner, the user may be informed of his real world settings while still having an eye on the VR content.

In certain embodiments, either the left or right eye display (but not necessarily both) may include real world content that is blended or displayed at about 20-80% transparency. As a result, the user may be able to continue experience the VR scene while also being made aware of his real world surroundings. In these and other embodiments, the real world content is not limited discrete objects (e.g., a chair), but can be a transparent view or partial view of the real world surroundings.

It should also be noted that the first and second criteria may depend on settings and parameters in addition to or instead of disorientation per se. For example, the first and second criteria may depend on user settings or preferences that are predetermined by the user or learned of the user through a user history. As a result, the user may choose or indicate that a first or second criterion is met. In these and other embodiments, the user may decide how to blend the virtual world view and the real world view based on his judgment.

In general, the user may be given control over what type (insertions of real world object/s, partial or whole views, border views, single eye views) and to what extent blending of real world content into virtual reality content as well as removal of real world content from virtual reality content should occur. For example, the user may define his preferences for how real world content is to be mixed or blended into the virtual reality content, according to some embodiments. In these and other embodiments, the user may decide on-the-fly how the two are blended. Although certain embodiment for deciding how to blend or insert or overlay real world content have been described for illustrative purposes, they should not be interpreted as limiting the embodiments described herein.

FIG. 1 shows an embodiment of virtual reality interactive space 100. A user 101 is connected to a head mounted display (HMD) 102. A plurality of sensors 104a-104n connect to the HMD 102, which in turn connects with a computer 110. Also connected to the HMD 102 are front facing cameras (FFC) 106 that capture images of the real world (e.g., the surroundings of the HMD). Although not shown, the HMD 102 may have more external cameras, e.g., which may be disposed to capture a 360 degree stitched view around the HMD user.

Front facing cameras 106 are used in a number of ways in the present embodiment. For example, the FFCs 106 provide the computer 110 with information on user position and orientation relative to the virtual reality interactive space. FFCs 106 are also able to capture a real world view of the real world. In certain embodiments, the FFCs 106 can be positioned on the HMD 102 so as to have a perspective and field of view that is similar to that of the user when wearing the HMD 102.

In addition to the FFCs 106 on the HMD 102, the present embodiment includes an HMD-facing camera (HMD-FC) 108. The HMD-FC 108 provides the computer with information on the user of the HMD 102 such as position and orientation. HMD-FC 108 is also able to capture additional perspectives of the real world, such as user body language. Information obtained by FFCs 106 and HMD-FCs 108 is communicated to the computer 110. Further, redundancy in some of their captured information allows the computer 110 to keep track of user 101 in case a connection is lost in any one of the individual cameras of 108 or 106.

Embodied within the computer is a content execution logic (CEL) 112. In general, the CEL 112 is responsible for deciding what content is to be presented on the HMD 102. For example, in certain embodiments, the CEL 112 will contain a disorientation detection logic (DDL) 116 that compares obtained sensor 104 data to certain criteria indicative of user disorientation.

Under conditions where the DDL 116 determines that the criteria are not met (e.g., the user is not disoriented), the CEL 112 may use a virtual reality content generator 114 to provide the HMD 102 with a VRS. In some embodiments, the VRS provided may include a virtual reality game, a virtual reality motion picture, a virtual reality sports game, a virtual reality product demo, or a virtual reality teleconference. In certain other embodiments, the VRS may include streaming video of gaming, "play-throughs" of video games, broadcasts of "eSports," and other gaming content. In still further embodiments, VRS may comprise of creative content such as virtual reality concerts, art shows, music performances, dance performances, theatre, and musicals, among other kinds of creative content. Additional embodiments may have VRS comprising of content related to education, do-it-yourself (DIY), tourism, real-estate, among others.

On the other hand, if the DDL 116 determines that one or more criteria are met indicating user disorientation, the CEL 112 may access a real world content generator 118. The real world content generator 118 is responsible for delivering real world views or otherwise augmenting a VRS with real world content obtained by the plurality of cameras disposed within the virtual reality interactive space (e.g. FFCs 106 and HMD-FCs 108). Depending on which criteria are being met, the CEL 112 may select and insert one or more real world objects according to the real world content generator 118. In other embodiments, CEL 112 may deliver a "split-screen" view of both VRS and real world content. In other instances, the CEL 112 may switch to a real world view altogether. In still further embodiments, CEL 112 may otherwise blend or overlay real world content with virtual reality content to create a partial real world view.

Once the CEL 112 augments a VRS with real world content and delivers it to HMD 102, the DDL 116 continues to monitor user disorientation (e.g., whether criteria are met). Depending on what the DDL 116 determines, the CEL 112 will decide whether and to what extent additional real world content should be introduced and/or removed from the virtual reality content.

Figure 2:
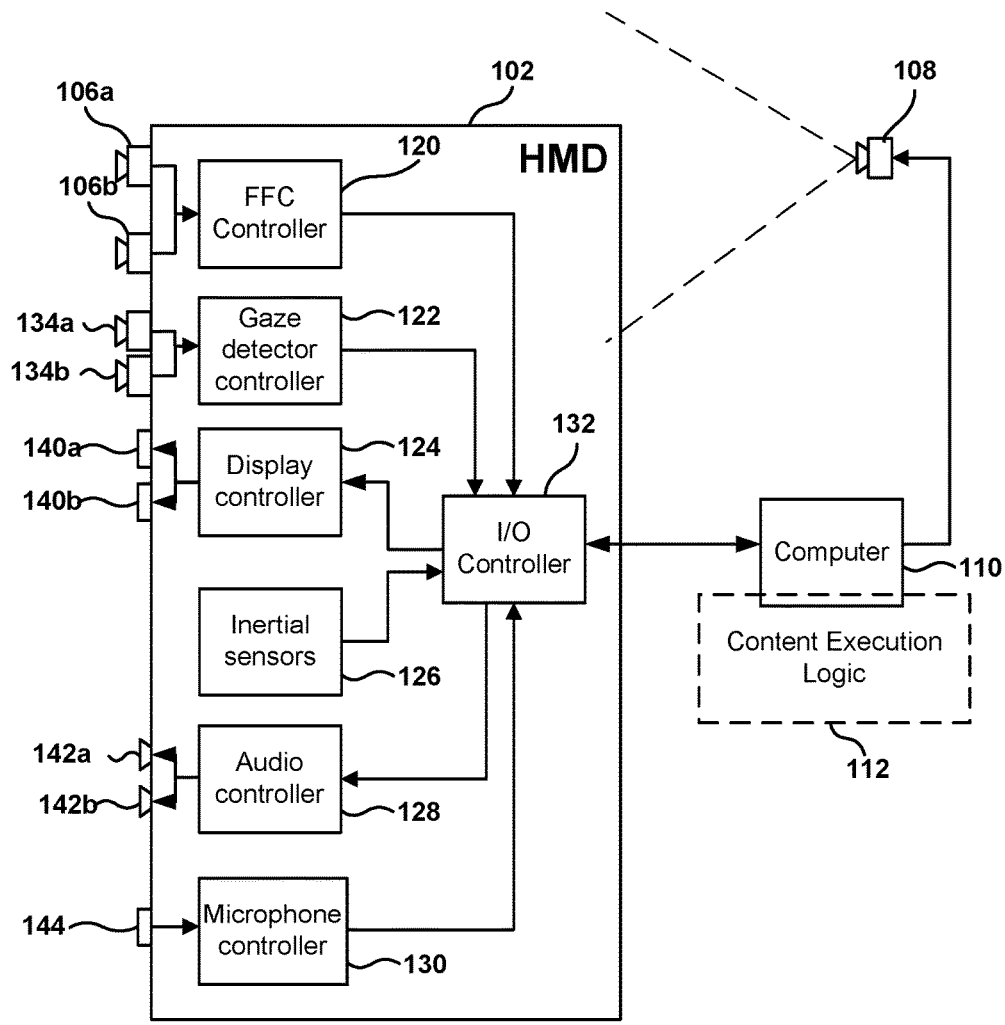
FIG. 2 illustrates certain components of an HMD that allow for presentation of a VRS and detection of user disorientation, according to one embodiment.

FIG. 2 shows one embodiment of a HMD 102. The HMD 102 comprises a number of components that dictate the VRS experience, including displays 140*a* and 140*b*, as well as audio speakers 142*a* and 142*b*. According to certain embodiments, these are controlled by their respective controllers, including display controller 124 and audio controller 128 located on the HMD 102. Both of these controllers communicate with the computer 110 via an input/output controller (I/O controller) 132, also located on HMD 102.

According to some embodiments, the HMD 102 also comprises one or more front facing cameras (FFCs) 106*a* and 106*b* that communicate with the computer via an FFC controller 120 and I/O controller 132. The FFCs 106 are able to capture a real world view of the real world from the perspective of a user wearing the HMD 102. For example, the FFCs 106 may be positioned so that they "look" at whichever direction the user is looking at in the real world had they not been wearing the HMD 102. In so doing, the FFCs 106 may provide a view of the real world even though the user's vision of the real world is occluded by the HMD 102. FFCs 106 are also sometimes called "pass-through" cameras, for their ability to allow the user to see pass through that which blocks their line of sight. Although the embodiment shown in FIG. 2 describes an HMD 102 with 2 FFCs 106, it should be appreciated that any number of "front facing" cameras may be used to capture and deliver a real world view.

A set of gaze detecting cameras, 134*a* and 134*b*, are also shown in FIG. 2. In general, gaze detection (or eye-tracking) is the process of measuring either a point of gaze ("where the user is looking") or a motion of an eye relative to the head. Thus, a gaze detector is a device for measuring eye position and movement.

In certain embodiments, eye gaze cameras may be located between a display and one or more lenses for viewing a VR scene. In this manner, the eye gaze cameras are enabled to have a better field of view of a user's eyes.

A number of methods can be used to measure eye movement and gaze direction. For example, some methods use video images from which eye position is extracted, while other methods use search coils or electrooculograms. Further methods may make use of an infrared camera or detector in which an infrared light is made incident on a retina. A user's gaze may thus be detected by capturing the reflected portion of incident light with the infrared camera. Images captured by the aforementioned cameras are subsequently routed to the computer 110 via a gaze detector controller 122 and the I/O controller 132.

Although FIG. 2 shows two of such gaze detecting cameras 134 for clarity, one for each eye, it can be appreciated that a number of cameras may be disposed within the HMD 102 for gaze detection.

Further shown in FIG. 2 are inertial sensors 126 located on the HMD 102. Inertial sensors 126 provide information to the computer including the position, orientation, and velocity of the HMD 102, for example, via dead-reckoning. These sensors may include accelerometers and gyroscopes for the tracking of movement and rotation of the HMD 102. U.S. application Ser. No. 11/382,036, entitled "METHODS AND SYSTEMS FOR APPLYING GEARING EFFECTS TO VISUAL TRACKING" and Ser. No. 12/259,181 entitled "CONTROLLER HAVING VISUALLY TRACKABLE OBJECT FOR INTERFACING WITH A GAMING SYSTEM" discuss types and configurations of sensors that may be included in or used with certain embodiments of HMD 102, and are hereby incorporated by reference.

A microphone, 144, is also shown to communicate with the computer via a microphone controller 130. The microphone may be used to detect audio cues from the real world, including voluntary commands or non-voluntary utterances from a user.

It should be noted that a number of additional components (e.g., sensors, controllers, etc.) have been left off of FIG. 2 for the sake of clarity. For example, in certain other embodiments, additional sensors may include moisture sensors for measuring sweat levels and thermometers for measuring a temperature of the HMD 102 user. In still a further embodiment, vibration sensors such as a piezoelectric sensor may also be included within the HMD 102 to measure smaller movement such as shaking or tremors that a user 101 may exhibit. Certain embodiments including electrodiagnostic (EDX) sensors such as abovementioned EKG, EMG, EEG sensors for measuring cardiological (e.g., heartbeat), neurological (e.g., brainwave), and other physiological parameters have likewise been omitted from FIG. 2. Thus the embodiment illustrated in FIG. 2 should not be interpreted to be exclusive or limiting, but rather exemplary or illustrative.

Figure 3:
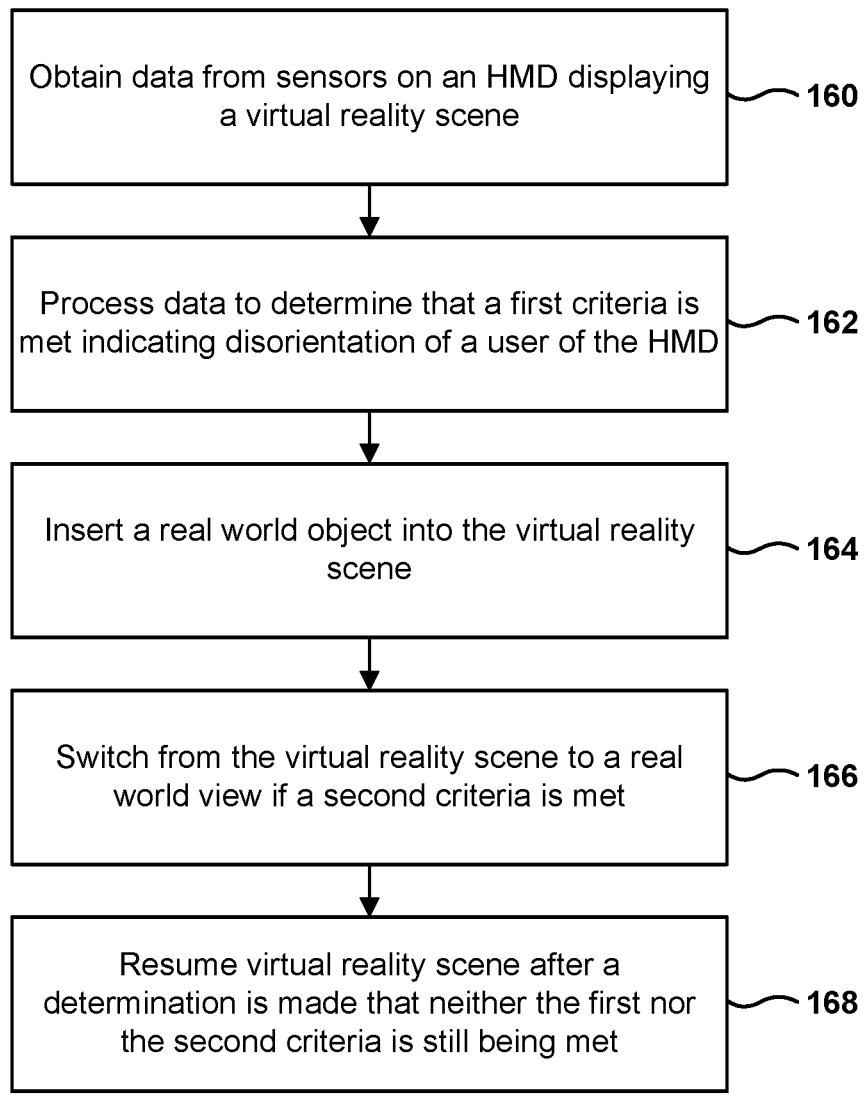
FIG. 3 shows the flow of a method for reorienting a disoriented user in one embodiment.

FIG. 3 is a flowchart of an exemplary method of reorienting a disoriented user 101. According to the present embodiment, the method changes the contents of a virtual reality scene that is being presented to the user. While the various operations in this flowchart are presented and described sequentially, one of ordinary skill will appreciate that some or all of the operations may be executed in a different order, be combined or omitted, or be executed in parallel.

In operation 160, the method obtains data from sensors located on the HMD 102 displaying a VRS. As earlier described in FIG. 2, these sensors may include gaze detectors 134, inertial sensors 126, audio sensors 144, etc. In addition but not shown, the method may obtain data from sensors located within the virtual reality interactive space but not on the HMD 102. For example, data may also be obtained from the HMD-FC 108.

From operation 160, the method flows to operation 162, where data obtained by operation 160 is processed and used to determine whether a first criteria is met. The first criteria correspond to a plurality of predetermined indicators that are suggestive of user disorientation. For example, certain predetermined indicators may be associated with certain patterns of eye movement suggestive of disorientation. Thus, if these certain patterns of eye movement are detected in a user 101, then the first criteria might be met. Likewise, certain patterns of head movement, body posture, body language, audible utterances, etc., may also be associated with predetermined indicators of user disorientation.

Once sensor data is obtained and processed by the method, operation 162 may do a comparison between the obtained data and the predetermined indicators. If there is an agreement between the obtained data and the predetermined indicators (e.g. obtained gaze detection data qualifies as one of the predetermined patterns of eye movement indicative of disorientation), operation 162 makes a determination that the first criteria is met. In some embodiments, once a positive determination is made, operation 162 may also slow down or pause the VRS.

Following a positive determination by operation 162, the method flows to operation 164, where a real world object (RWO) is inserted into the VRS. The RWO is an object or a field of view in the real world that is captured by one or more cameras disposed within the virtual reality interactive space. For example, the RWO might be a coffee table situated in the field of view of the user. As another example, the object might be a quadrant or portion of the user's field of view, such as a floor view or a view of a distal wall panel.

The RWO(s), once captured by a camera (e.g., the FFC 106 or the HMD-FC 108), is inserted into the VRS being displayed by the HMD 102. As a result, the user is provided with a VRS being augmented by one or more RWO(s). Following the above example, the RWO augmented VRS (or simply, augmented VRS) might comprise of a scene otherwise unaltered but for a superimposed image of the coffee table. In one embodiment, the method may insert the RWO such that both the coffee table and the virtual content upon which it is superimposed are both partially visible. In certain other embodiments, the insertion of the RWO may come at the exclusion of the virtual content over which the RWO is inserted. In still further embodiments, the RWO may be inserted with dynamic transparency, adjusting over time to the user's response and/or the context of the virtual content.

In certain embodiments, the method might insert the RWO at a location within the display that corresponds to its location in the real world relative to the user's field of view. For example, if a coffee table is situated in the lower right-hand periphery of the user's would-be view and is captured by FFC 106, the method may insert an image of the coffee table at a corresponding location in the lower right-hand peripheral portion of the display. In addition, according to some embodiments, the image of the coffee table may be of a size, focus, and/or perspective that the table would otherwise appear to the user absent the HMD 102.

For example, an image corresponding to a coffee table that is located closer in the real world to the user 101 may be sized in the augmented VRS to occupy a larger portion of the display screen 140 than the same coffee located farther away. In similar fashion, an image of the coffee table might be presented out-of-focus and/or with a depth of focus that simulates how the coffee table would otherwise appear to the user were it not for HMD 102 limiting the user's view of the real world.

Following certain embodiments, some or all insertion parameters of the RWO (location, size, focus, perspective, etc.) changes in real-time in response to changes in the user's 101 location, orientation, gaze direction, etc. In keeping with the above example, if the RWO is first presented at a lower right-hand peripheral portion of the HMD 102 display but a moment later the user 101 turns her head to the right, the insertion location may map accordingly to the left. Likewise, as the RWO approaches the user's center of view from a periphery due to a change in gaze direction, the RWO might be presented with increasing focus.

Although not shown in FIG. 3 for clarity, operation 164 may continue to progressively augment the VRS with additional RWOs. This progressive augmentation may continue until, for example, the first criteria is no longer met (e.g., the user has been reoriented), or as another example, operation 166 determines that a second criteria is met.

Much like the first criteria of operation 162, the second criteria of operation 166 also correspond to predetermined indicators of user disorientation. However, the predetermined indicators associated with the second criteria may not be the same as those of the first. For example, the predetermined indicators of the second criteria may be associated with different patterns in user behavior suggestive of disorientation. In another embodiment, the second criteria may share some of the indicators with the first but have different thresholds for what qualifies as meeting the criteria. In further embodiments, the second criteria may correspond to indicators that are a function of how the disoriented user responds to augmented VRS after the first criteria is met. In still additional embodiments, the second criteria may comprise a combination of the aforementioned indicators.

Once it is determined by operation 166 that a second criteria is met, a switching occurs from VRS or augmented VRS to a real world view (RWV). In certain embodiments, the RWV is provided by the FFC 106. The switching to the RWV may happen in a number of ways. For example, in some embodiments, the switch can be fast. In other embodiments, the switch can occur slowly with the VRS fading out while the RWV fades in. In still other embodiments, the switch may occur in a customizable fashion by the user.

Though not shown in FIG. 3 for clarity, operation 166 can occur in parallel with operation 162. Accordingly, a determination that a second criteria is met is not necessarily contingent on the first criteria being met. In some embodiments, operation 166 may determine that the second criteria is met without consideration for operations 162 or 164. For example, if it is determined that both the first criteria and the second criteria are met at the same moment in time, operation 166 will control, according to some embodiments. In certain other embodiments, even if operation 162 makes a positive determination and begins to augment the VRS but operation 166 also makes a positive determination in the meantime, operation 166 will control, and a switching may occur instead of augmentation. Thus, in these embodiments, operation 166 can "override" operations 162 and 164. Additionally, operation 166 may, in some embodiments, pause the VRS or augmented VRS once a positive determination is made.

If it is determined that neither the first nor the second criteria are still being met (e.g., the user has been reoriented), operation 168 proceeds to resume the VRS without augmentation. According to some embodiments, operation 168 may resume the VRS at a point earlier in the time course of the VRS than that at which a positive determination was made by operation 162 or 166.

Figure 4:
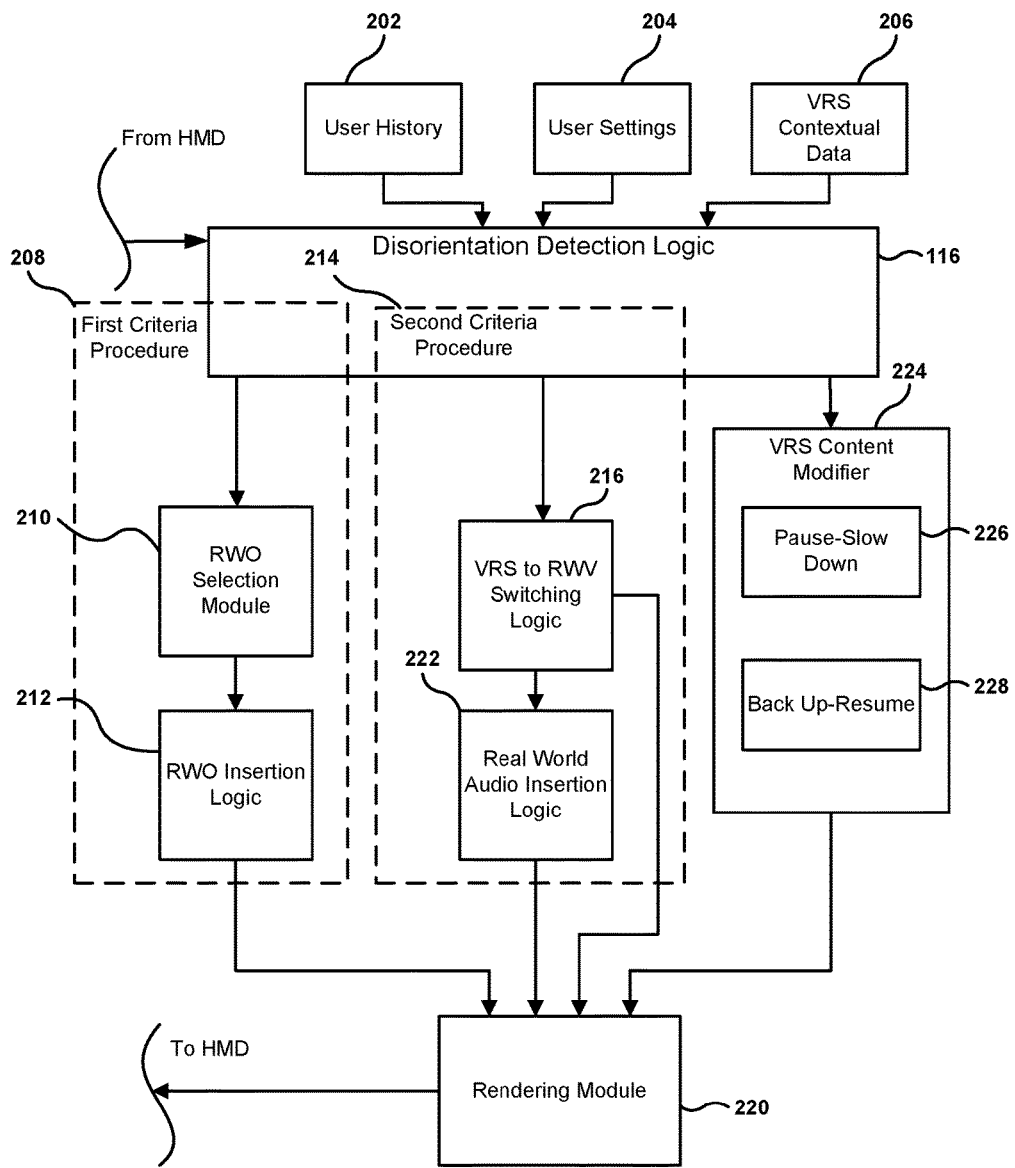
FIG. 4 illustrates some of the components of a computer capable of detecting user disorientation and reorienting the user, according to one embodiment.

FIG. 4 illustrates certain components within the computer 110 capable of carrying out operations consistent with the present invention, such as those of FIG. 3 (operations 160-168). In particular, a DDL 116 is shown to receive data from the HMD 102. In some embodiments, the DDL 116 also receives input from user history 202, user settings 204, and VRS contextual data 206.

According to some embodiments, user history 202 may function as a store for user information, especially as it relates to disorientation. For example, the user history 202 may contain a log of the instances of VRS corresponding to instances of disorientation. As a further example, the user history may indicate to the DDL 116 that the user has a history of disorientation in the presence of flying-related VRS. As yet another example, the user history may indicate that the user is more likely to become disoriented in the late evenings than in the afternoon.

The user settings 204 is another component that communicates with the DDL 116 and stores information regarding a particular user and her dispositions to disorientation. In the case of user settings, parameters associated with disorientation may be set and controlled by the user. For example, a user who has a tendency to get motion sickness under certain conditions may indicate so under user settings. From user history information, the DDL 116 may, for example, upregulate its sensitivity for motion sickness under those indicated conditions. In some embodiments, this increased sensitivity may be implemented by lowering thresholds for the predetermined indicators of disorientation associated with those indicated conditions.

At the other extreme, a user with a high general tolerance for disorientation may likewise indicate so under user settings. The DDL 116 in this case may downregulate sensitivity for disorientation across some or all parameters. Decreasing sensitivity to certain indicators may be implemented by an increasing of thresholds for predetermined indicators for disorientation. as reflected by increased thresholds for predetermined indicators for disorientation. As a result, the user may be allowed to "play-through" certain classes and intensities of disorientation.

It should be noted that "predetermined indicators" as used herein is not meant to imply that said indicators are unchanging or permanent, only that they are defined or definable at those instances for which they are used by the DDL 116 in making a determination. For example, a predetermined indicator associated with vertigo may comprise of measuring eye-movement, for a property horizontal nystagmus (involuntary eye movement), over a threshold 60 Hz for 3 seconds (60 movements per second for at least 3 seconds). As more information is gathered about the user history 202, user data, 204, and VRS contextual data 206, said predetermined indicator associated with vertigo might change with regard to any of abovementioned measurables. Additional embodiments may have predetermined indicators change or update periodically or in real-time depending on user history 202, user settings 204, VRS contextual data 206, and the state of the user and/or VRS. Further embodiments may introduce new predetermined indicators altogether based on research data, scientific data, collective user data, and machine learned data, among others.

The DDL 116 additionally receives input from VRS contextual data 206, which provides metadata on the context of the corresponding VRS being displayed or to be displayed. In certain embodiments, the DDL 116 may then adjust parameters according to data obtained from the user history 202 and user settings 204. For example, the DDL 116 may fine tune sensitivity to disorientation for a user predisposed to motion sickness under flying conditions based on VRS contextual data 206 indicating that an upcoming scene entails flying.

The DDL 116 is operable to assess user disorientation by making determinations as to whether first and/or second criteria are met, based on sensor data and further adjusted for any user history 202, settings 204, and VRS contextual data 206. In one embodiment, the DDL 116 is able to detect and distinguish from a number of categories of disorientation. For example, symptoms of vertigo may be different than that of motion sickness or that of double-vision. Accordingly, the DDL 116 may be capable of deciphering incoming data, cross-referenced against user history 202, settings 204, and contextual data 206, to resolve the particular classes and/or intensities of disorientation.

If the first criteria is met but not the second, the method flows to a first criteria procedure 208. If the second criteria is met, the method flows to a second criteria procedure 214. Moreover, if either criteria are met, the method also flows to a VRS content modifier 224.

The first criteria procedure 208 implements a process of selecting and inserting a real world object into the VRS following a determination that the first criteria has been met. For example, under the first criteria procedure 208, a RWO selection module 210 identifies which RWO within the field of view of the FFC 106 is to be augmented into the VRS. In certain embodiments, the module's selection process is based on an effectiveness a particular object is expected to have at relieving the type(s) and/or degree(s) of disorientation (or, expected reorientation effectiveness). This selection process embodiment is described in more detail in FIG. 12.

Once an object is selected, the method flows to the RWO insertion logic 212. The insertion logic 212 is responsible for mapping the selected object from the real world onto the virtual reality display. As such, it takes into account parameters of RWO location, size, focus, and perspective, as was previously discussed.

If the second criteria is met, the method flows to the second criteria procedure 214, which includes a VRS to RWV switching logic 216 and in some embodiments, a real world audio insertion logic 222. The switching logic 216 determines how to switch from a VRS or an augmented VRS to a RWV. In some embodiments, the switch may occur fast, while in others, slowly. Alternatively, the switch may entail an intermediate transition screen interposed between the VRS and the RWV, for example a blank screen, a screen with words, or a screen otherwise able to ease the disoriented user out of the VRS. In some embodiments, the manner of switching may additionally be based on data obtained from user history 202, settings 204, and VRS contextual information 206.

The real world audio insertion logic 222 inserts audio from the real world into the audio output of the speakers 142 of the HMD 102 once the VRS to RWV switching logic 216 begins. Much like the switching logic 216, the real world audio insertion logic 222 transitions the user from a VRS to a real world experience by reconciling the audio output with the display output of the HMD 102. In so doing, a user may be given a fuller opportunity to reorient without taking off the HMD 102 altogether.

The method also flows to the VRS content modifier 224 if either criteria are met, where the VRS may be modified to accommodate the first 208 or second criteria procedure 214. In some embodiments, the VRS content modifier 224 includes a pause-slow down component 226 and a back up-resume component 228. These are able to slow down, for example, a VRS when a first criteria is met so that the user can focus more on reorienting and less on the VRS. If, on the other hand, the second criteria is met, the VRS is made to pause by component 226.

Once the VRS is made to slow down and pause, the back up-resume component 228 determines when and how to restart the VRS. In some embodiments, it may be determined that the VRS should be "rewound" and certain length. In certain other embodiments, the VRS may simply be made to resume without "rewinding." In still further embodiments, the VRS content modifier may resume the VRS slowed down so that the user is provided a period to reacclimatize to the VRS, after which the VRS may proceed at a rate that was before a slowing or pausing.

Each of the first 208 and second criteria 214 procedure and the VRS content modifier 224 communicates with a rendering module 220, which renders the content to be provided to the HMD 102. In some embodiments, the rendering module 220 may include one or more CPUs, GPUs, memories, and audio drivers. Once the content is rendered, whether a full VRS, augmented VRS, or a RWV, the rendering module 220 communicates the rendered content to the HMD 102.

Figure 5D:
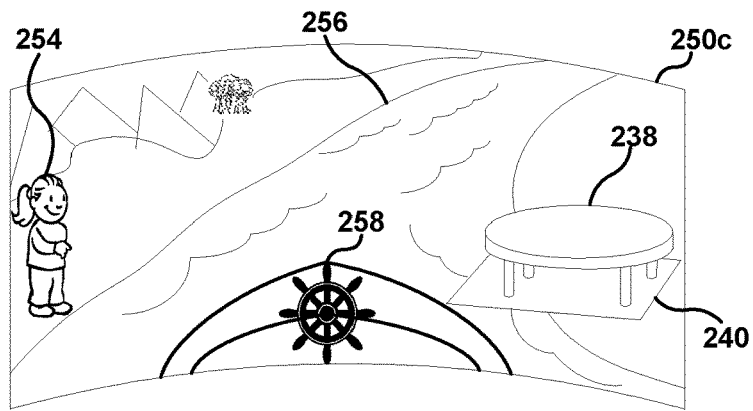

FIG. 5A shows a real world setting 230 in which a user 101, situated within the setting, is wearing an HMD 102. The real world setting 230 comprises a set of objects, including a coffee table 238, a rug 240, a chair 236, a lamp 234, a TV 232, and a package 242. The setting is also shown to include a set of boundary conditions, including a floor 237, a distal wall panel 233a, a left wall panel, 233b, and a right wall panel 233c. The user is situated and oriented such that she has a 'would-be' field of view (not shown) that may encompass all of the aforementioned objects and boundary conditions, except for the package 242. A front facing camera 106 mounted to the HMD 102 is shown to share a similar field of view 231.

FIG. 5B is a two dimensional representation of how a VRS might appear to user 101 wearing HMD 102 at a point in time. VRS 250a is one of a boat 258 cruising down a river 256. Downstream of the boat 258 is a character 254 on the boat's left hand side. Further downstream is a house 257 on the boat's right-hand side.

FIG. 5C is a two dimensional representation of a real world view 250b of the real world setting 230 as it would appear to user 101 wearing HMD 102. In the present embodiment, the real world view 250b, captured by FFC 106, contains all of the aforementioned boundary conditions and objects except for package 242.

In general, RWV 250b dynamically corresponds to the user's would-be view in real-time. Thus, if the user happens to turn her head leftward, package 242 may fall into the RWV while coffee table 238 and rug 240 may fall out of the RWV (this view is not shown).

If it is determined that a first criteria is met (but not a second criteria) indicating user disorientation, the computer's DDL 116 may proceed to implement the first criteria procedure 208. In some embodiments, this involves selecting and inserting a first real world object by the RWO selection module 210. As a result, VRS 250a becomes augmented VRS 250c, which is similar to VRS 250a but for a superimposed image of coffee table 238 and rug 240. Additionally, the VRS has continued to progress in time, which is made apparent by the approaching character 254.

It should be noted that in this particular embodiment, coffee table 238 and rug 240 have been selected and inserted together as a single unified object whereas in the real world they may be perceived as distinct. While the two objects may be inserted separately in other embodiments, the present figure demonstrates an important aspect of the RWO selection module 210.

In the present embodiment, the RWO selection module 210 is configured to counteract a specific category or class of disorientation as determined by the DDL 116, for example a loss in sense of grounding or an onset of "sea legs." Of the set of objects in view, the RWO selection module 210 may determine that a combination of two objects may impart greater effectiveness than either one of them alone. As a result, the selection module 210 might consolidate the two imaged objects to be inserted as one. As may be the case, the selection module 210 in this embodiment is able to determine that the rug 240, while providing a frame of reference for the ground (e.g., z-axis) may be inadequate in doing the same for the x and y axis. It may also be determined that the inverse is true of the coffee table 238 alone. Thus the two might be merged and treated as a single object to be inserted. In certain other embodiments, three or more individual objects or boundary conditions may be aggregated by the RWO selection module 210 to be inserted together. In still further embodiments, objects may be inserted individually without aggregation.

The rug 240, in the previous example, may also be referred to as a grounding element. According to some embodiments, grounding elements are important objects, boundary conditions or portions thereof that, when company to real world objects, provide enhanced object recognition, spatial awareness and/or confidence of judgment for a user.

It should also be noted that house 257 is obscured from view in the present embodiment of augmented VRS 250c. In certain other embodiments, house 257 may retain some level of visibility.

Figure 5E:
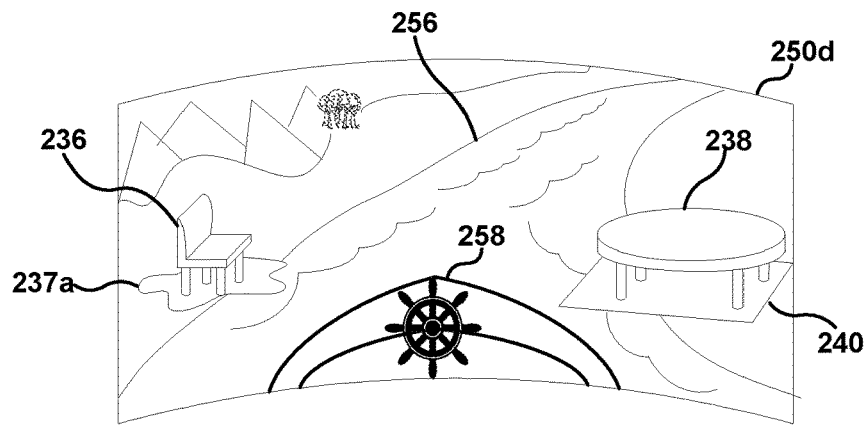

According to some embodiments, if after some period of time it is further determined that the first criteria is still being met (but not the second criteria), an additional object may be inserted into the augmented VRS 250c to become augmented VRS 250d of FIG. 5E. The object inserted in the present embodiment is chair 236. Accompanying the chair is a grounding element 237a, which is appended to the image of chair 236 by the RWO selection module 210 and RWO insertion logic 212, according to some embodiments. Similar to the insertion of aggregated coffee table 238 and rug 240, the selection module 210 and insertion logic 212 may determine the chair 236 is more effective when inserted with a grounding element 237a. In these embodiments, the grounding element 237a may provide the user 101 with a greater sense of grounding and spatial awareness than chair 236 alone.

Figure 5F:
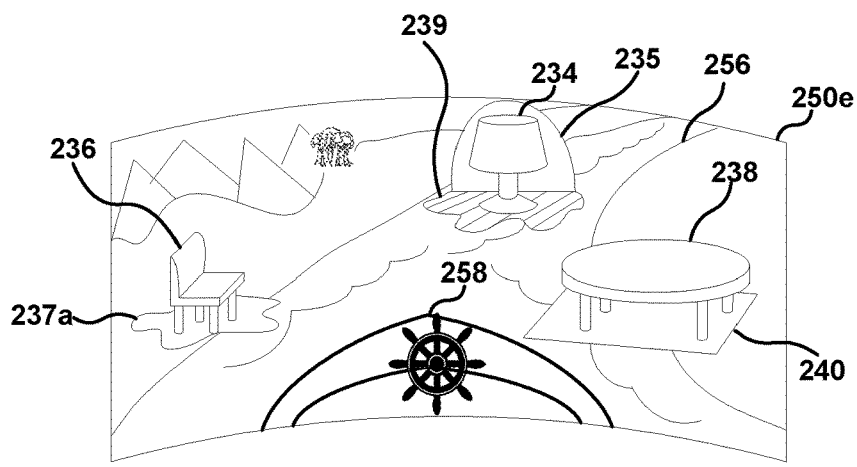

As earlier discussed, the first criteria procedure 208 continues to progressively augment the VRS with additional RWOs until there is a negative determination of the first criteria or a positive determination of the second. FIG. 5F is an embodiment of a further augmented VRS, 250e, in which lamp 234 has been selected and inserted. Much like the coffee table 238 and the chair 236, the lamp 234 is inserted with grounding. In the case of the lamp 234, however, two grounding elements are appended to an image of the lamp 234: a distal wall panel grounding element 235 and a ground grounding element 239. In certain embodiments, grounding an object to multiple boundary conditions may provide a potentially greater sense of grounding and spatial awareness than either lamp 234 alone, or lamp 234 with a single grounding element alone.

According to certain embodiments, the determination of the extent to which an object should be grounded involves an analysis of a tradeoff between providing a greater degree of grounding and interfering with a VRS. For example, it may be the case that while additional grounding may help to ground a user to greater extent, it may also happen that such additional grounding interferes with the VRS or augmented VRS being displayed. Thus, the RWS selection module 210 and insertion logic 212, may, in certain embodiments, consider this tradeoff, and determine the degree and type of grounding accordingly. In the case of lamp 234, for example, grounding elements 235 and 239 may have been determined to have a grounding effect that outweighs its concurrent interference with the VRS. If, on the other hand, it is determined that grounding elements 235 or 239 interfere with the VRS or augmented VRS to a greater extent than to which they provide grounding, said grounding elements 235 and 239 may be omitted.

Figure 5G:
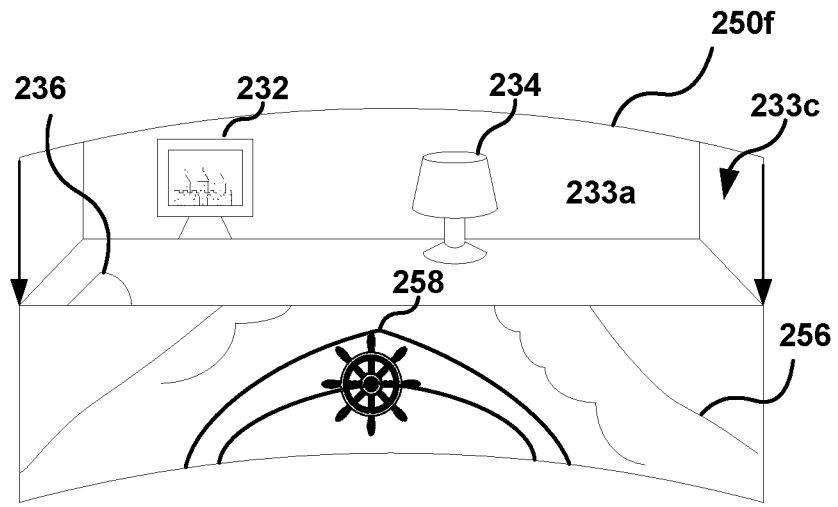
Figure 5H:
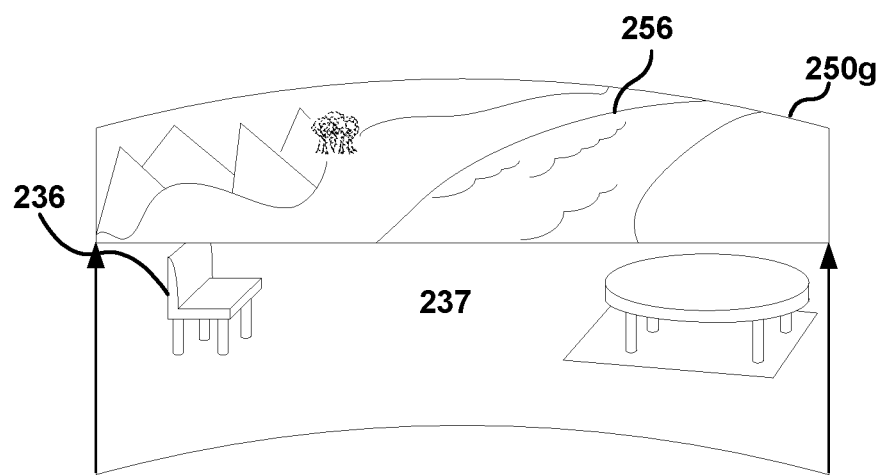

In certain other embodiments, the DDL 116 may decide based on the class and intensity of disorientation detected that the RWO selection module 210 should insert an entire quadrant of the real world view 250b to augment the VRS. The result of this method of object insertion may be a "split screen" display. FIGS. 5G and 5H show VRS augmented in this fashion. Split screen augmented VRS 250f and 250g differ only in way the screen becomes split. For example, augmented VRS 250f is a top-down fade-in to horizontal split screen augmented VRS, whereas 250g is a bottom-up fade-in to horizontal split screen augmented. Depending on a number of factors, including information provided by the DDL 116 as to the user's state of disorientation, user history 202, user settings 204, and contextual information 206, the first criteria procedure 208 (e.g., DDL 116, RWO selection module 210 and insertion logic 212) determines which of the two to implement.

Figure 7A:
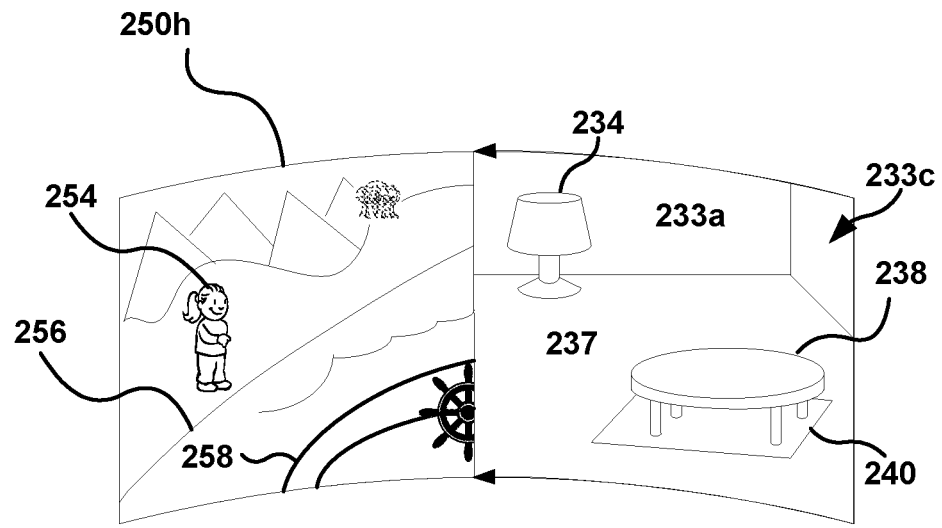
FIGS. 7A-7B show different ways of augmenting a VRS, according to some embodiments.
Figure 7B:
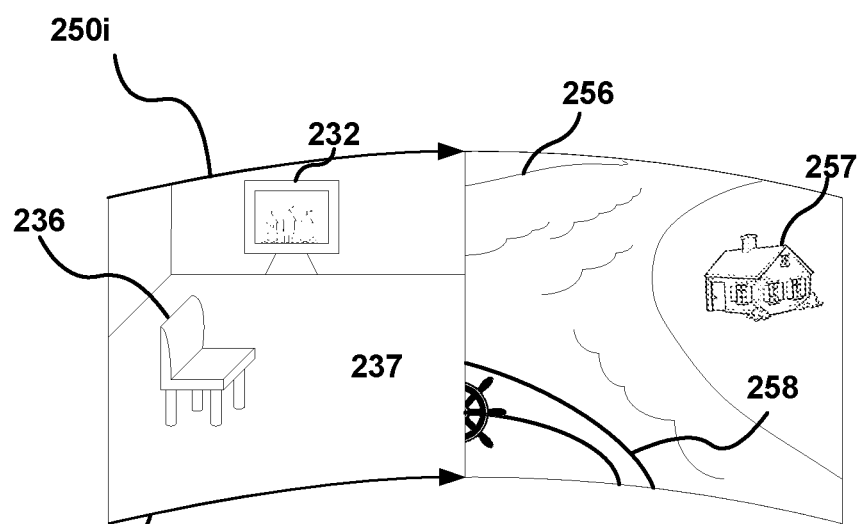

FIGS. 7A and 7B show right-to-left 250h and left-to-right 250i fade-in to vertical split screen augmented VRS, respectively. Again, the first criteria procedure determines which of split screen augmented VRS is to be implemented. Although not shown, there are a number of additional ways to augment VRS with real world content. One skilled in the art will appreciate that those additional methods of augmenting VRS do not depart from the spirit and scope of the present invention. For example, while FIGS. 5E, 5F, 7A, and 7B show roughly equally split screen augmented VRS, a split may include more VRS and less RWV and vice versa. Furthermore embodiments of the present invention may include different geometries of split, for example corner split, diagonal split, non-linear splits, etc.

Figure 6:
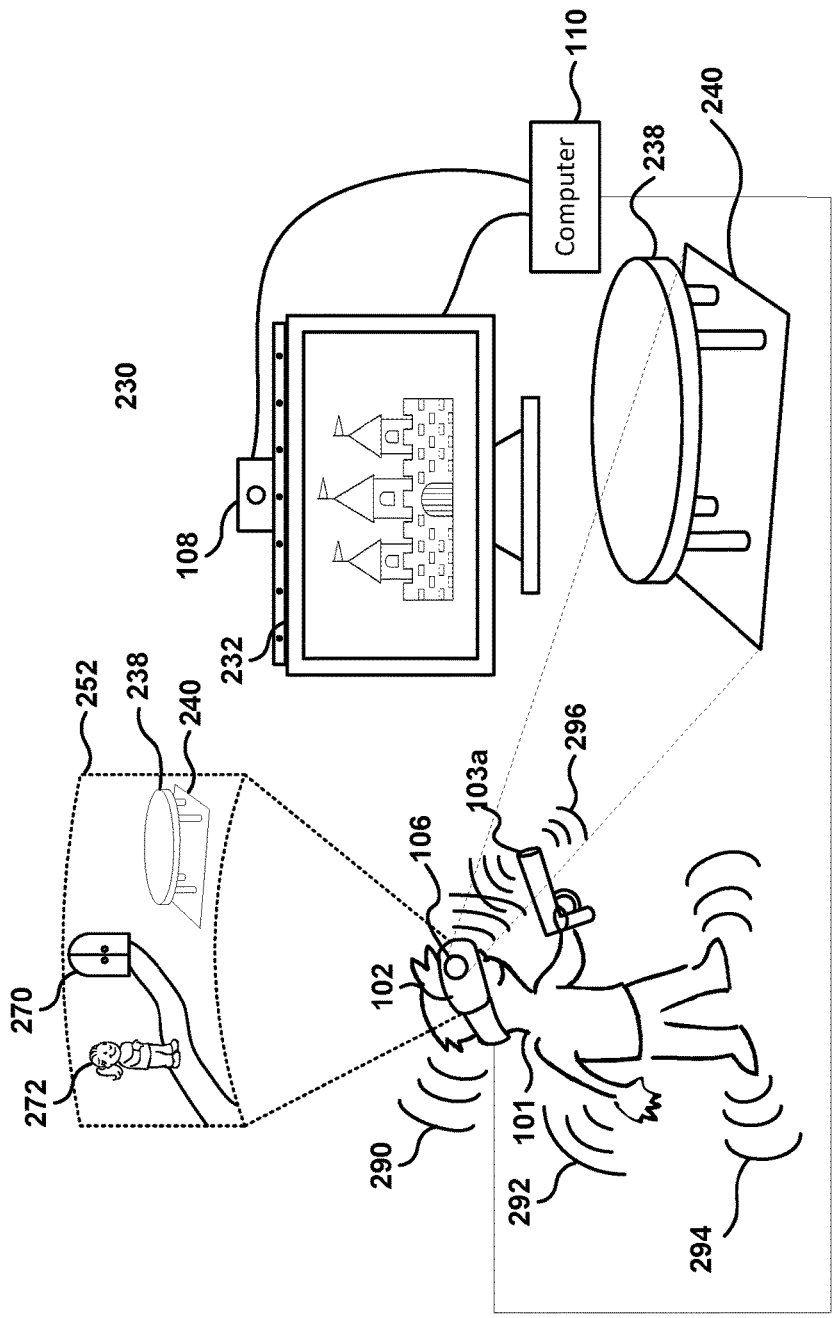
FIG. 6 illustrates an example of a user experiencing disorientation and being presented an augmented VRS, according to one embodiment.

FIG. 6 is a third party perspective of a user 101 being presented with an augmented VRS, 252. Augmented VRS 252 is shown to include character 272 and door 270 and RWOs coffee table 238 and rug 240. User 101 is shown to exhibit a number of abnormal patterns of movement, indicated by rippling lines 290, 292, 294, and 296, while holding controller 103a. Sensors on the HMD 102 and elsewhere in the virtual reality interactive space capture these abnormal patterns whereupon computer 110 determines that a first criteria is met. FFC 106 captures images of coffee table 238 and rug 240, which are then selected and inserted into the virtual reality scene by computer 110. The result is an augmented VRS 252 wherein an image of the real world object is superimposed onto the VRS.

In certain other embodiments, computer 110 may additionally present an augmented VRS to warn the user of a potential real world hazard, such as a running into or tripping over an object. For example, if user 101 were to wander into close proximity of coffee table 238 during the course of a VRS, computer 110 may be able to predict a potential hazard of tripping via HMD-FC 108, FFC 106 or additional cameras within the virtual reality interactive space. According to some embodiments, computer 110 is configured to alert user 101 by inserting an image of the hazardous object into the VRS at a location that corresponds to its location in real world relative to the user. For example, if coffee table 238 happens to be "2 'O-clock" of user, the image of coffee table 238 might be superimposed on the VRS display 140 60° from the center line of view.

In certain embodiments, hazardous objects may be inserted to appear closer than they are in real world. In other embodiments, hazardous objects might be superimposed to appear farther than they are in reality, much like a car side mirror. In still further embodiments, the hazardous object may be presented to appear as far or close as it actually is in real world.

Further embodiments of augmented VRS in the absence of user disorientation per se, may include 'on-demand' augmentation as controlled by the user. For example, the user might be interested in the score of a sports game playing on TV. Instead of disengaging from the VRS entirely by removing the HMD 102, the user could instruct the computer to augment the VRS momentarily. In some embodiments, this could be done via voice control, e.g. "show me the TV for 3 seconds." In other embodiments, instruction may occur through a controller operable to augment the VRS on demand such as via a physical button. In still further embodiments, the user is able to instruct the computer of what is to be augmented by pointing in the direction she wants to see.

Figure 8:
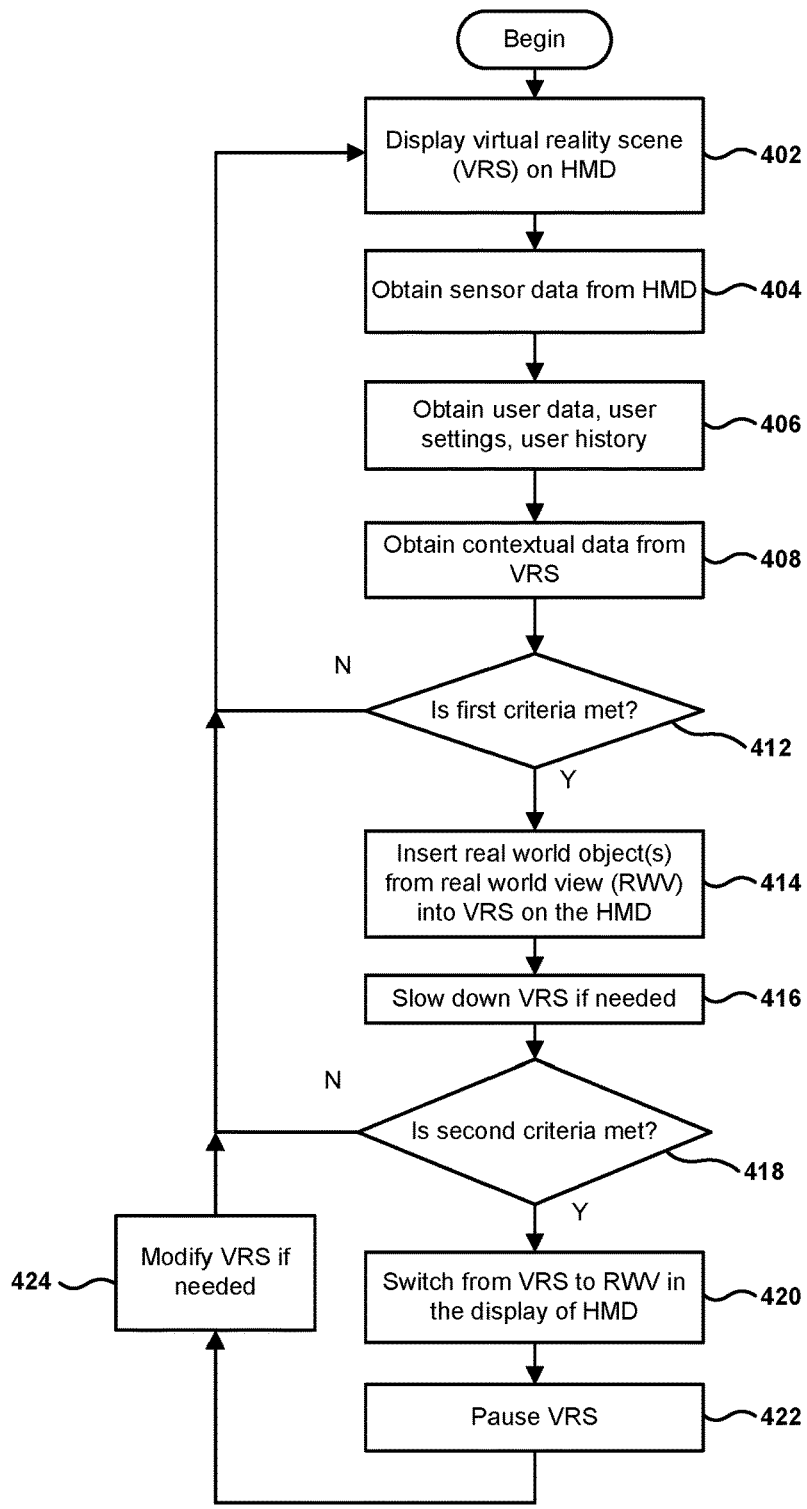
FIG. 8 illustrates a flow chart of an algorithm to be implemented by a computer for augmenting or changing a VRS into an augmented VRS or a real world view, according to some embodiments.

FIG. 8 is a flowchart showing an embodiment of a method for determining how to augment a VRS with real world content. First, a VRS is displayed on an HMD 102 in 402. While the VRS is being displayed, operations 404, 406, and 408 obtain sensor data from HMD 102, user history 202, user settings 204, and VRS contextual information 206, respectively. A decision is made in step 412 as to whether a first criteria is met. If "No", the method cycles back to 402. If a "Yes" determination is made, the method flows to operation 414, which inserts RWO into the VRS. According certain embodiments, the RWO may be partially overlaid on to the VRS. In certain other embodiments, a partial real world view may be overlaid onto the VRS in operation 414. Depending on the context of the VRS and the degree to which RWO interferes with the VRS, operation 416 may slow down the augmented VRS accordingly.

The method then flows to decision 418, which determines whether a second criteria is met. If "No," the method cycles back to operation 402, wherein additional RWOs may be inserted if the first criteria continues to be met. If, on the other hand the answer is "Yes," the method flows to operation 420, which switches from the VRS to a real world view. The VRS is subsequently paused at operation 422 once the switch occurs. The method then flows to operation 424, which modifies VRS if needed. Modification might involve "rewinding" the VRS to an earlier point in time. According to the embodiment shown, the method continues to cycle through the method while the VRS is being displayed.

It should be noted that while the various operations in this flowchart are presented and described sequentially, one of ordinary skill will appreciate that some or all of the operations may be executed in a different order, be combined or omitted, or be executed in parallel. For example, as was earlier discussed, the method may flow to decision 418 without having to first obtain a "Yes" determination at decision 412.

Figure 9:
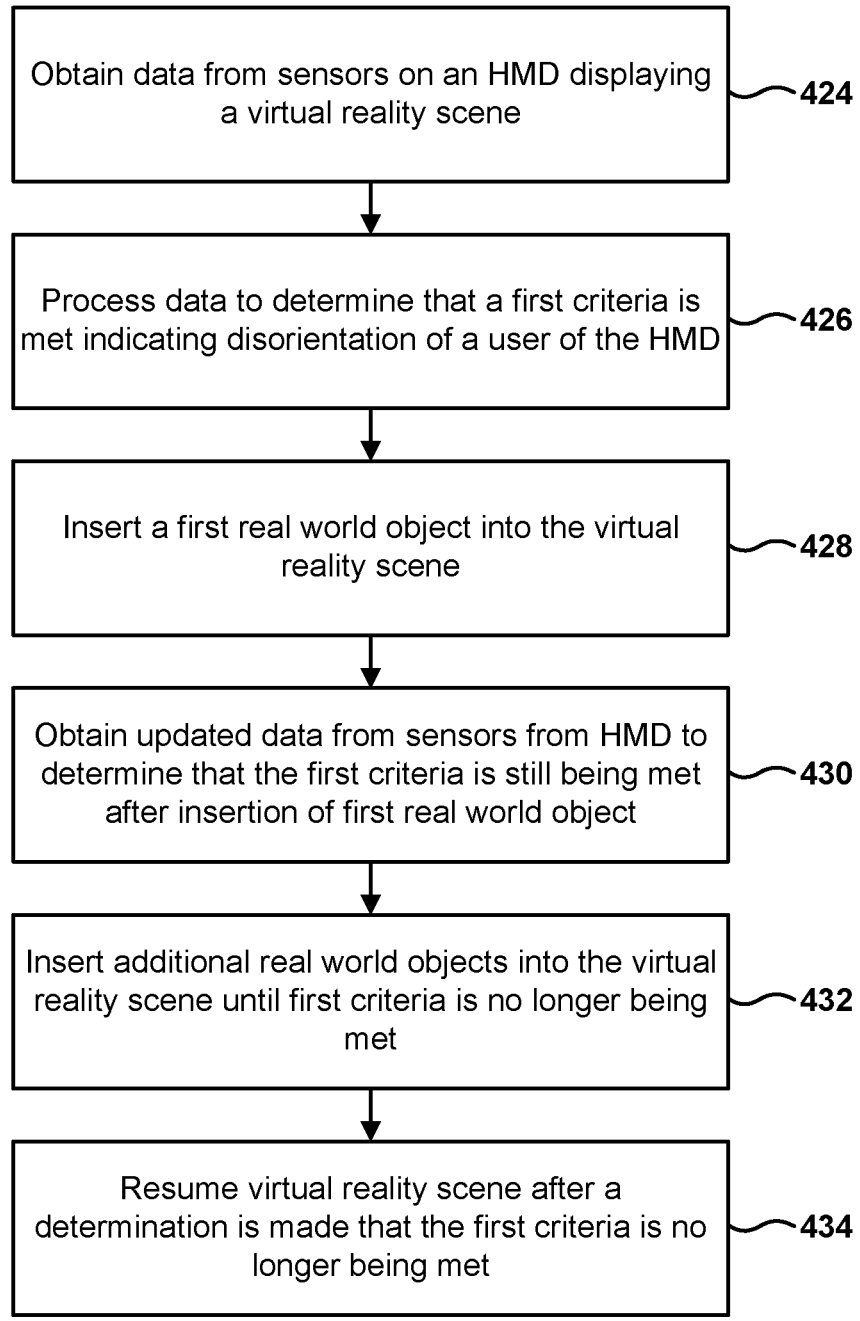
FIG. 9 shows a flow of a method of augmenting a VRS with progressively more real world objects, according to one embodiment.

FIG. 9 is an embodiment of an augmented VRS method much like that described in FIG. 3. For illustrative purposes, operations 430 and 432 for obtaining updated sensor data and progressively augmenting a VRS with additional RWOs until a first criteria is no longer met, are specified. The embodiment shown by FIG. 9 demonstrates the progressive nature of augmenting VRS based on user response.

Figure 10:
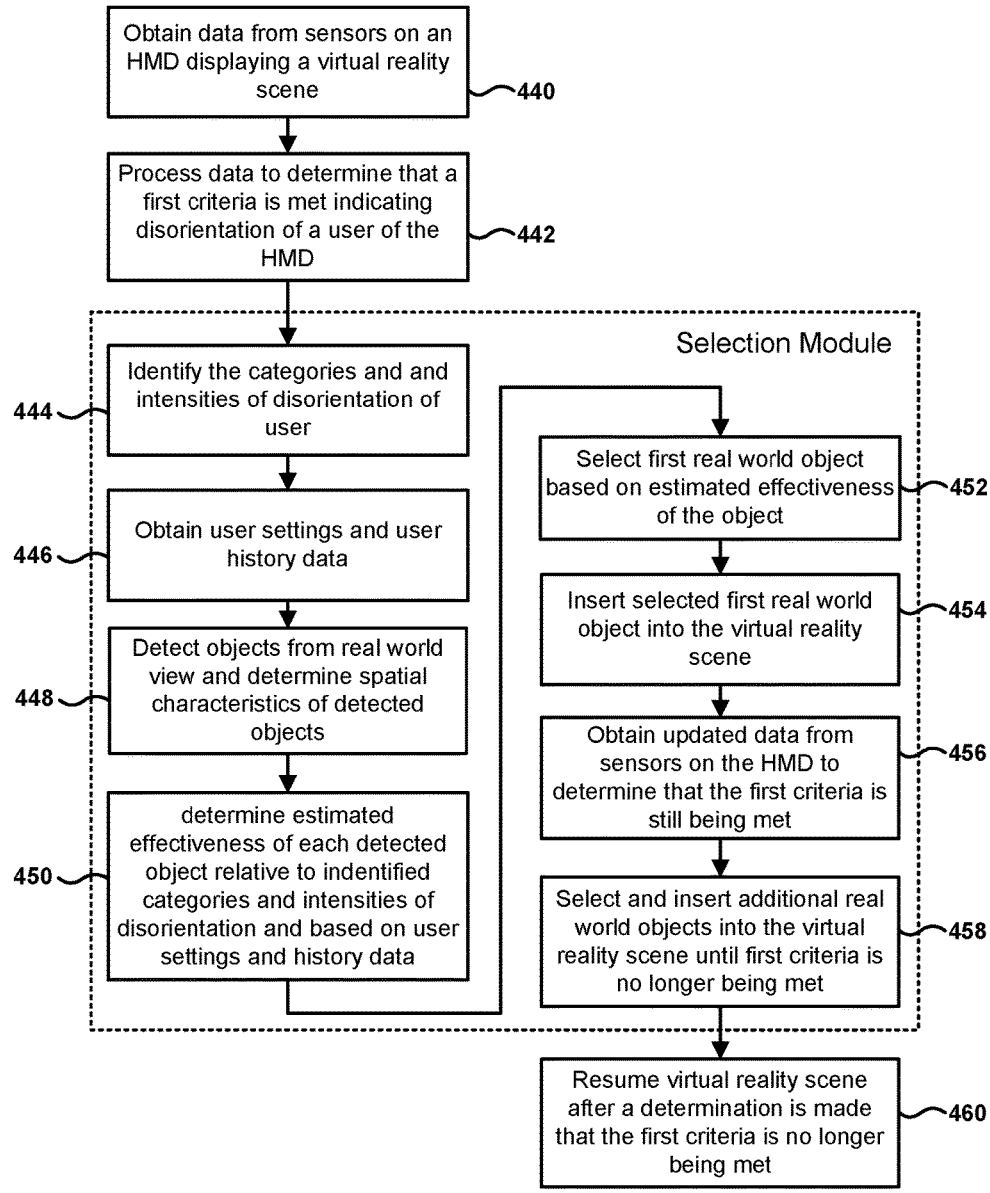
FIG. 10 shows a flow of a method to be carried out by a computer for determining how to select real world objects to be augmented into a VRS out of a number of real world objects, according to one embodiment.

Likewise, FIG. 10 is also an additional embodiment of the method for augmenting VRS with an emphasis on the RWO selection process. Operation 444 serves to identify the categories and intensities of disorientation of a user. In this embodiment, various classes of user disorientation are differentiated and quantified. For example, a particular embodiment may distinguish a user symptomatic of vertigo, from her loss of sense of gravity, from her double vision. It may also find that of the three categories of disorientation, only the vertigo component is severe while double vision and loss of sense of gravity are determined to be moderate and mild, respectively.

The method then flows to operation 446 where user history 202 and user settings 204 are obtained, and further to operation 448, where the method detects RWOs and determines certain spatial characteristics of the same. For example, the method may detect a total of 3 objects and determine that the first object is non-stationary, the second partially concealed and very distant, and the third non-moving, fully visible, not so distant, grounded, and having 3 dimensional depth.

From operation 448, the method flows to operation 450, which determines an estimated effectiveness of each detected object at alleviating disorientation relative to classes and intensities identified in operation 444, and user data (e.g user history 202, user settings 204) obtained in operation 446. Estimated effectiveness may also be known as expected reorientation effectiveness. For example, of the 3 detected objects, operation 450 may determine that the third object has a greater expected reorientation effectiveness (ERE) than that of the first or second object, relative to the user's particular state of disorientation. Operation 450 may further determine that the first object, although having a lesser ERE than the third, has a greater one than the second. It may be determined, for example, by operation 450 that the first object is more effective at counteracting double vision, whereas the second object is more effective at counteracting a loss of sense of gravity. Owing to the detected profile of user disorientation provided by operation 444, operation 452 may thus select the first object over the third object for its insertion sequence or order. Were it the case that the user demonstrated a greater degree of loss of sense of gravity than double vision, then operation 452 might order the three objects differently within a sequence.

Once operation 450 determines which objects are to be augmented into the VRS and in what order, operation 454 proceeds to perform the insertion process. In the current example, the third object is inserted into the RWS first. Thus operation 454 may be instantiated by a RWO insertion logic 212 component of FIG. 4. Updated sensor data is subsequently obtained in operation 456 to determine, for example, how the user has responded to a 1-object augmented VRS. If, for example, operation 456 determines that the first criteria is still being met, a second selected object is further augmented into the 1-object augmented VRS to become a 2-object augmented VRS by operation 458. Following with the same example, the second object may then be inserted into the VRS via operation 458.

Further yet, operation 458 continues to progressively augment the VRS with additional objects until the first criteria no longer met (or that a second criteria is met). If it is the case that the first criteria is no longer met, as determined by operation 458, the method flows to operation 460 wherein the VRS is resumed. Certain features of the present embodiment have been intentionally left out for the sake of clarity. For example, operation 458 might also be configured to stop augmentation of the VRS if it is separately determined that a second criteria is met, as was earlier discussed.

Figure 11A:
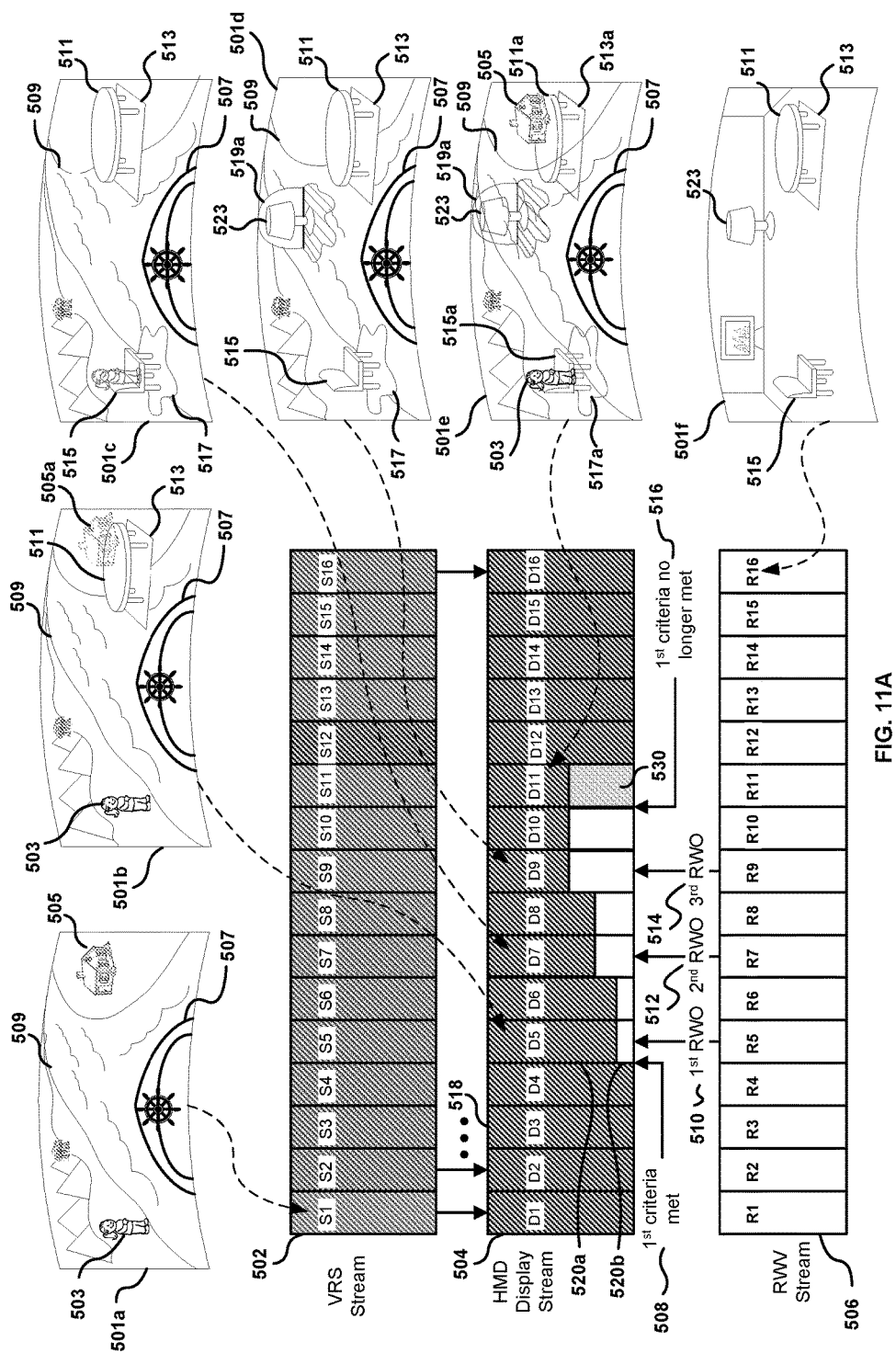
FIG. 11A shows a representation of a method for augmenting a VRS in which a first criteria is first met and then subsequently no longer met, according to one embodiment.

FIG. 11A is a diagram showing the relationship between the VRS augmentation operations and what a user might be presented with via an HMD 102 display. Virtual reality scene stream 502 is shown to be comprised of a sequence of blocks or segments S1-S16. Each segment represents an arbitrarily defined stretch of VRS content within a stream. The same is true of an HMD display stream 504 and a real world view stream 506. Arrows 532 indicate that that VRS stream 502 is feeding the HMD stream 504. The extent to which the HMD display stream 504 comprises of the VRS stream 502 or the RWV 506 stream is proportional to the area either one occupies in each block or segment, wherein a gray crosshatch pattern represents VRS stream 502 and a no-fill pattern, the RWV stream 506.

Accordingly, HMD segments D1-D4 are shown to be fully comprised by VRS stream 502 content D1-D4. For example, segment D3 (518) is shown to have the same content as S3. How segment 518 might appear to a user 101 is represented by a snapshot 501a, which comprises a boat 507, character 503, house 505, and river 509.

In the present embodiment, HMD display stream 504 ceases to be composed only of VRS stream 502 once a first criteria is met 508 between segments D4 and D5. Segment D5 is shown to be composed of both VRS 502 and RWV streams 506, which is represented by a partitioning of the segment into crosshatch pattern 520a and no-fill pattern 520b sub-segments. Sub-segment 520b represents a result of process 510, an insertion of a first RWO. The remainder of segment D5, 520a represents the remaining VRS stream 502. A corresponding snapshot of D5 is shown in 520a. The first RWO is captured from RWV segment R5, which corresponds to snapshot 501f. For the sake of clarity, the real world view is assumed to stay unchanged throughout the course of the stream.

Snapshot 501b is similar to the prior snapshot 501a except for a superimposed image of coffee table 511 and rug 513. Notably, house 505 of scene 501b is still partially visible at 505a. As previously discussed, there are a number of ways to superimpose a RWO onto a VRS, including, in this case of segment 520, retaining a degree of visibility for what the inserted RWO would otherwise conceal.

Over the course of segments D5-D10, it is shown that a second RWO 512 and a third RWO 514 are progressively augmented into the HMD display stream 504, shown respectively by snapshots 501c and 501d. Notably, snapshot 501c depicts the second RWO to be both chair 515 and grounding element 517.

In the current embodiment, this is represented by progressively larger proportioned no-fill sub-segments. For example, in HMD display segment D9, two additional RWOs are shown to be inserted. The corresponding snapshot 501c depicts a total of three RWOs superimposed onto VRS stream 502 segment D9. Also for the sake of clarity, VRS segments S1 through S16 are taken to be unchanging the throughout the course of the stream.

In the present example, it is determined at 516 that the first criteria is no longer met. The segment following this determination, D11, is shown to have similar partitioning as the prior scene D10. However, what was previously a no-fill sub-segment in D10, is presently in D11 a partial crosshatch sub-segment 530. Thus, sub-segment 530 represents a transition state between augmented VRS and non-augmented VRS. The corresponding snapshot 501e illustrates how segment D11 might appear to a user. Notably, VRS content such as character 503 and house 505 have been brought back into view while RWOs 515a, 523, 511a (as well as accompanying grounding elements) are being faded out of view. The very next segment, D12, is shown to be non-augmented, representing a completed transition back to VRS stream.

Figure 11B:
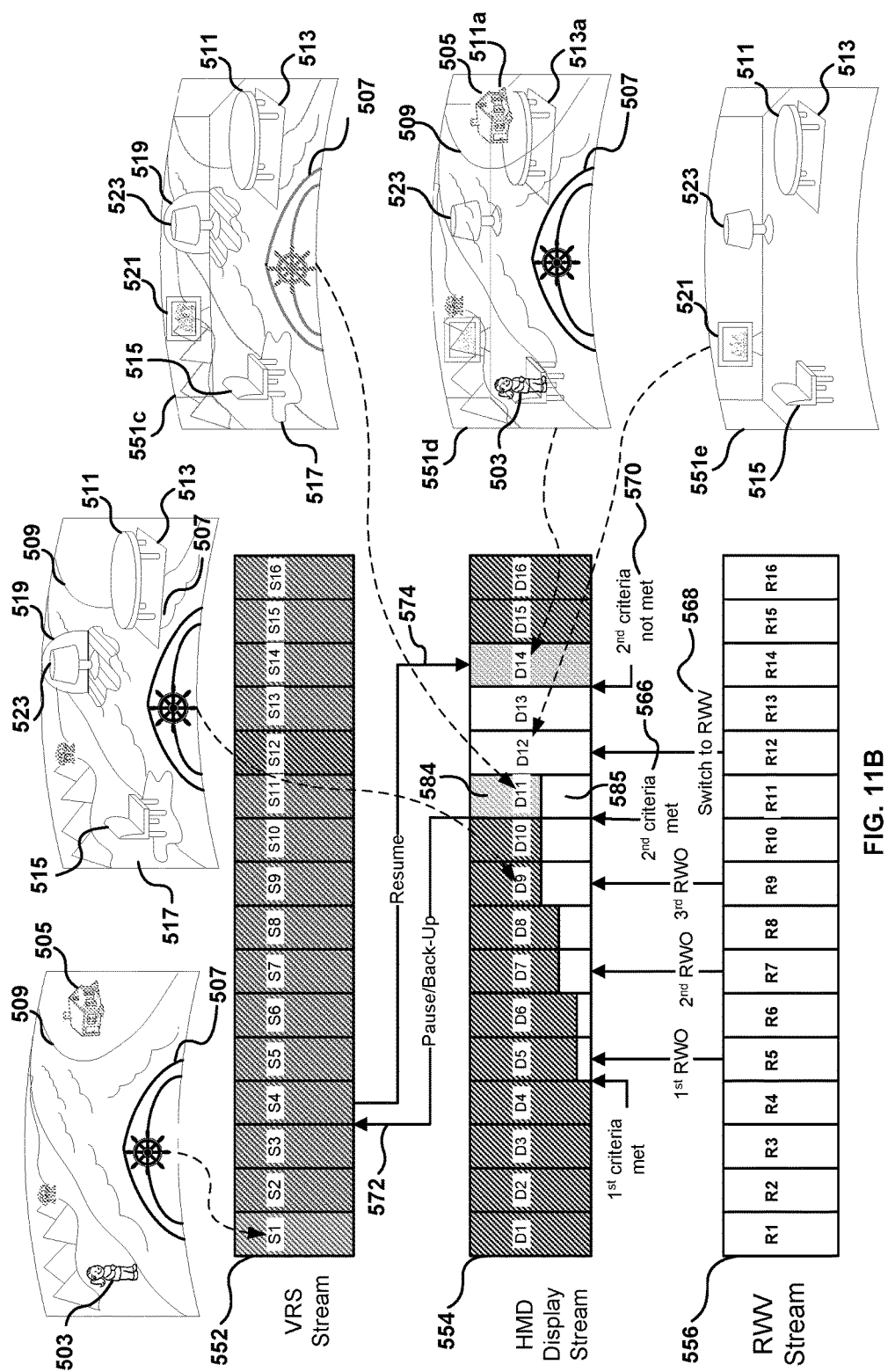
FIG. 11B shows a representation of a method for augmenting a VRS in which a first criteria is first met and a second criteria is subsequently met, according to one embodiment.

FIG. 11B, much like FIG. 11A, shows a first criteria being met with three subsequent RWOs being inserted into the HMD display stream 554 from RWV 556. However, notably, a determination that a second criteria is met 566 occurs after segment D10. Following determination 566 includes a pausing or a backing-up of the VRS content 572. In the present embodiment, pause/back-up 572 rewinds and pauses the VRS stream to segment S4. In certain other embodiments, pause/back-up 572 may rewind farther back than other embodiments. In the present example, pause/back-up 572 maps to the VRS segment occurring immediately prior to the point at which the first criteria is met 558. This may allow the user to resume the VRS stream 552 at a point before an apparent onset of disorientation is detected.

Following a determination that a second criteria is met 566, there is a switch to RWV stream 556 for segment D11. D11 retains RWOs 585 but begins to fade out the rest of VRS 584. The corresponding snapshot 551c is shown to have RWOs 515, 523, 511, and accompanying grounding elements (517, 519, and 513, respectively) with full visibility and a fading in of the rest of the real world view, including TV 521 and three boundary conditions. Meanwhile, what is left of the VRS content is faded out, including river 509 and boat 507.

In the current embodiment, segment D12 contains a full RWV as shown in snapshot 551e. In the present embodiment, the RWV continues through to D13, whereupon it is determined that the second criteria is no longer met 570. D14 is a transition state back to VRS represented by only a partial crosshatching fill-in. Notably, the VRS segment being transitioned back to is the segment chosen by pause/back-up 572. In the current example, D14 is resumed at S4 by resume 574. Snapshot 551d is shown to have VRS content fading in while RWV is being faded out. D15 is non-augmented VRS of segment S5. Although not shown for clarity, there are a number of alternative embodiments that one skilled in the art would readily appreciate from the examples provided.

User 101 may wish to share a clip of the VRS in which she experienced disorientation as detected by the DDL 116 with others. In certain embodiments, this is made possible by the computer 110, which may save a portion of the VRS in response to a first or second determination being made. This portion of the VRS may then be made shareable through a memory device, a networked device or the internet.

Figure 12:
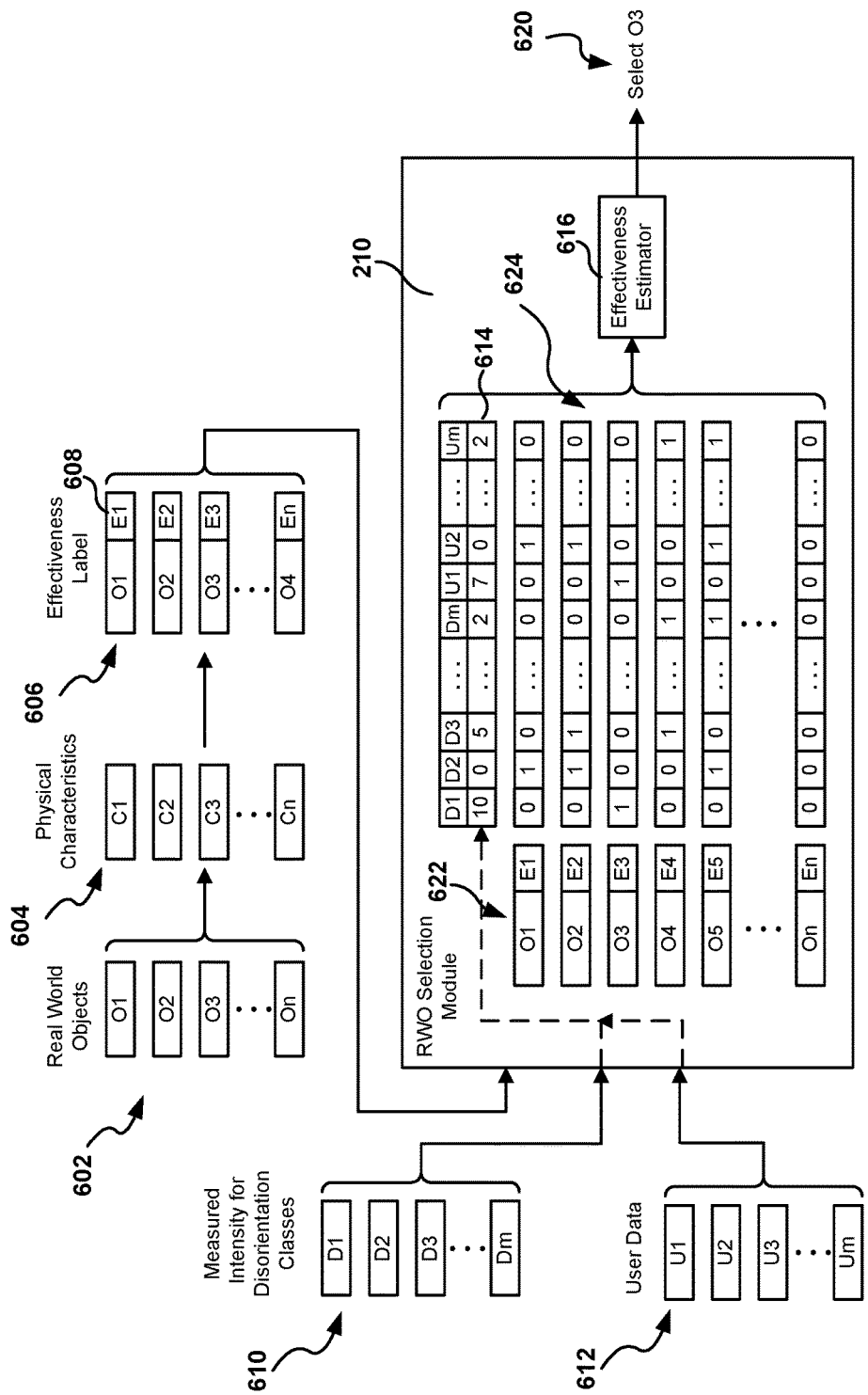
FIG. 12 shows a method for selecting and ranking real world objects to be augmented to a VRS according to an expected reorientation effectiveness, consistent with one embodiment.

FIG. 12 shows one embodiment of how a selection process 600 is performed by RWO selection module 210. In the present embodiment, real world objects O1 to On 602 are detected and subsequently analyzed for their physical characteristics C1 to Cn. Physical characteristics 604 might include spatial and visual parameters such as distance from user, size of object, lighting/brightness of object, grounding of object relative to boundary conditions, depth of object relative to user, stillness of object, color, contrast, levelness, shape, reflectivity, texture, visibility, connectivity of object to other objects, shadow effect of object, uniqueness of object within a set of other objects, sharpness of object, among many more.

Physical characteristics, once analyzed, provide each detected object with effectiveness label E1-En 608. In the present embodiment, the effectiveness labeled object 606 is a measure of how effective a particular object is expected to be at counteracting individual classes of disorientation D1-Dm 610 (e.g, reorienting the user). Effectiveness labels 608 per se may differ from expected reorientation effectiveness (ERE). For example, an effectiveness label 608 for a particular object is based primarily on physical characteristics 604 of that object. An ERE of a particular object, although based on that object's effectiveness label, is determined further in view of a particular state of disorientation and/or user and contextual data.

As previously discussed, human disorientation may come in one or more of a number of forms. Common classes of disorientation associated with virtual reality include loss of sense of gravity (weightlessness), balance (disequilibrioception), relative position of body parts to another (propriocep- tion), position, orientation, as well as vertigo (feeling that objects are moving when they are not), subjective vertigo (feeling that body is moving when no movement is taking place), seasickness, blurred vision, double vision (diplopia), fearing for one's life, among many others. These examples are not meant to be an exhaustive or authoritative list of the understood and less understood classes of disorientation. Nor are these examples meant to imply that these classes have well defined boundaries or are exclusionary of one another.

Nonetheless, according to certain implementations, certain visual and spatial properties of objects and boundary conditions are recognized to have greater effectiveness for certain states of disorientation than others. For example, it may be the case that a distal wall panel is more effective against subjective vertigo, yet not at all for disequilibrioception. It may also be the case that the ground boundary condition is effective against disequilbrioception and feeling of weightlessness, but not for vertigo, sea sickness, or double vision. The degree of effectiveness of a particular object against various classes of disorientation is captured by its effectiveness label. Although effectiveness labels may be quantified, for the sake of clarity, they have been shown in binary, e.g. "1" for "effective" and "0" for "not effective." Effectiveness labels for objects O1-On are indicated by vectors 624.

Furthermore, the present embodiment may also measure the intensity of each detected class of disorientation 610. For example, it may be detected by the DDL 116 that D1, D2, D3, and Dm are 10, 0, 5, and 2, respectively, where D1 might stand for vertigo, D2 for weightlessness, D3 for loss of sense of balance, and Dm for double vision. For the sake of clarity, values assigned to each class are given in arbitrary units that positively correlate with intensity. Also in the present embodiment, user data U1-Um 612 is mapped from user settings 204 and history 202 "space" to "disorientation intensity space." For example, if the user has demonstrated a low tolerance for vertigo, but a high one for the feeling of weightlessness, U1 might be assigned a value of 7 and U2 a value of 2. These values, also in arbitrary units, correlate positively with sensitivity. Parameters D1-Dm and U1-Um as measured and/or mapped are shown by a vector 614.

In the provided example, objects O1-On and their effectiveness labels 622 are compared against the detected classes and intensities of user disorientation and user data 614. In this example, an effectiveness estimator 616 processes this information to calculate an expected reorientation effectiveness of each object relative to the state of the user. For example, the effectiveness estimator 616 may determine that object O3, being effective against $D_1$ and $U_1$, has the greatest expected reorientation effectiveness. As a result, RWO selection module 210 may select object O3 620, according to this embodiment.

In a further embodiment, the RWO selection module 210 may determine an order or rank of objects based on their expected reorientation effectiveness. In this embodiment, the effectiveness estimator 616 might produce a rank of objects O1-On to be O3, O4, O2, O5, O1, etc. An insertion logic 212, as previously described, might then progressively augment the VRS with additional objects based on a rank provided by the effectiveness estimator 616 of the RWO selection module 210.

Figure 13:
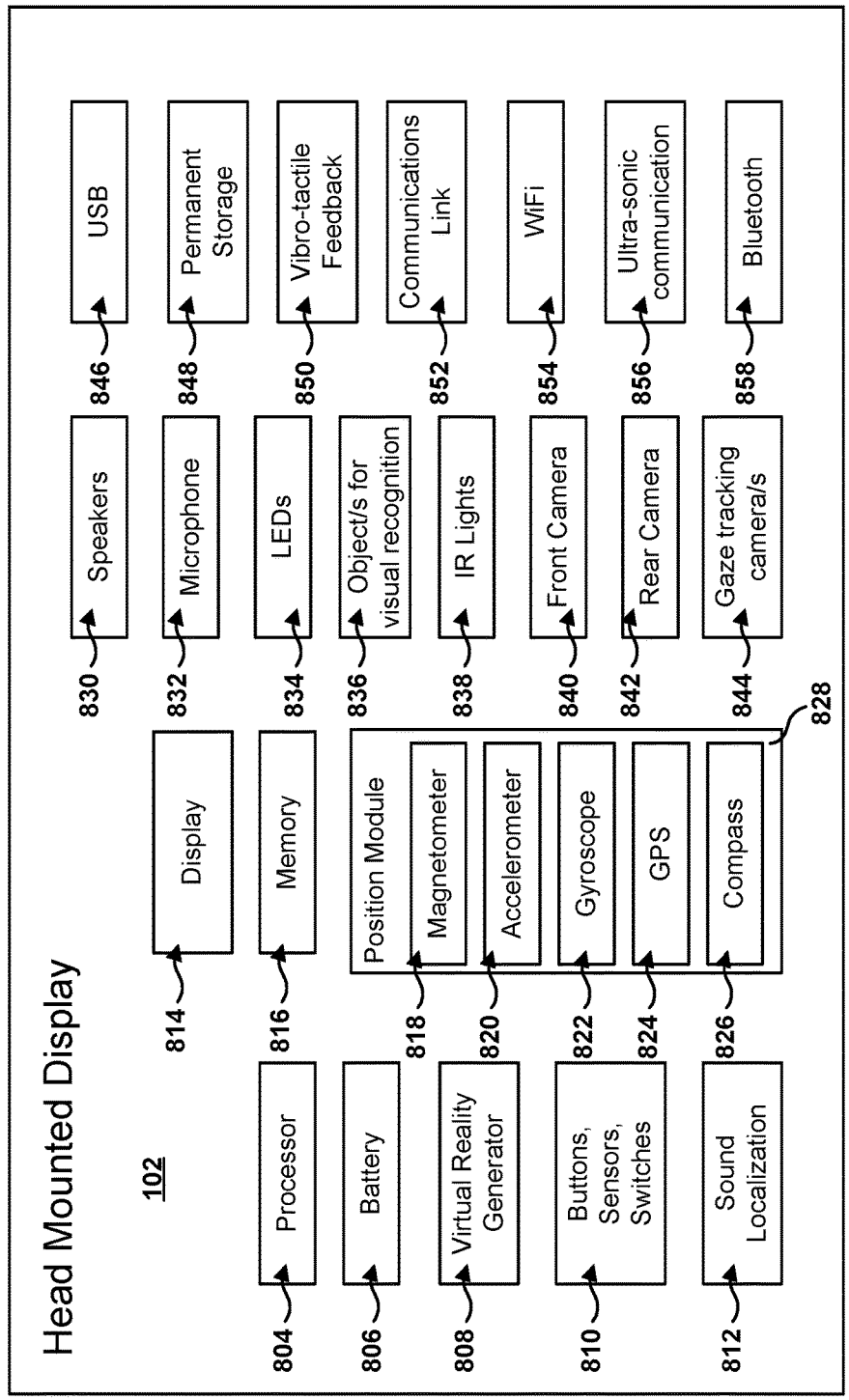
FIG. 13 shows an embodiment of some of the components of a head mounted display, according to one embodiment.

FIG. 13 illustrates an additional embodiment of HMD 102 that may be used for the purposes of the present invention. HMD 102 includes hardware such as a processor 804, battery 806, virtual reality generator 808, buttons, sensors, switches 810, sound localization 812, display 814, and memory 816. HMD 102 is also shown to include a position module 828 that comprises a magnetometer 818, an accelerometer 820, a gyroscope 822, a GPS 824, and a compass 826. Further included on HMD 102 are speakers 830, microphone 832, LEDs 834, object/s for visual recognition 836, IR lights 838, front camera 840, rear camera 842, gaze tracking camera/s 844, USB 846, permanent storage 848, vibro-tactile feedback 850, communications link 852, WiFi 854, ultra-sonic communication 856, and Bluetooth 858.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the changing of VRS operations are performed in the desired way.

The entire disclosure of co-pending U.S. application Ser. No. 14/206,219, filed Mar. 12, 2014, entitled "SWITCHING MODE OF OPERATION IN A HEAD MOUNTED DISPLAY," is hereby fully incorporated by reference. The entire disclosure of co-pending U.S. application Ser. No. 14/658,123, filed Mar. 13, 2014, entitled "METHODS AND SYSTEMS TRACKING HEAD MOUNTED DISPLAY (HMD AND CALIBRATIONS FOR HMD HEADBAND ADJUSTMENTS," is hereby fully incorporated by reference. The entire disclosure of co-pending U.S. application Ser. No. 14/615,115, filed Feb. 5, 2015, entitled "MOTION SICKNESS MONITORING AND APPLICATION OF SUPPLEMENTAL SOUND TO COUNTERACT SICKNESS," is hereby fully incorporated by reference. The entire disclosure of co-pending U.S. application Ser. No. 14/658,123, filed Mar. 13, 2014, entitled "METHODS AND SYSTEMS TRACKING HEAD MOUNTED DISPLAY (HMD AND CALIBRATIONS FOR HMD HEADBAND ADJUSTMENTS," is hereby fully incorporated by reference.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for changing a virtual reality scene displayed in a head mounted display (HMD), comprising:
   obtaining sensor data from sensors on the HMD, the sensors including inertial sensors;
   processing the sensor data for determining that a criteria is met to transition from the virtual reality scene to an augmented virtual reality scene to be presented by the HMD, the criteria corresponding to predetermined indicators that are suggestive of disorientation of a user when wearing the HMD and being presented the virtual reality scene, the augmented virtual reality scene being a modified version of the virtual reality scene;
   overlaying, based on said determining that the criteria is met, at least part of a real world object from a real world view into the virtual reality scene for the augmented virtual reality scene, the real world view being captured by one or more cameras of the HMD;
   determining that the criteria is still met after said overlaying and continuing to sequentially overlay additional real world objects as long as the criteria is still met.

2. The method as recited in claim 1, further comprising: discontinuing overlay of additional real world objects when the criteria is no longer met.

3. The method as recited in claim 2, wherein the additional real world objects include expanded views of the real world object.

4. The method of claim 2, wherein when the criteria is no longer met, the at least part of a real world object and the additional real world objects are sequentially removed from the augmented virtual reality scene.

5. The method as recited in claim 1, further comprising, pausing the virtual reality scene after overlaying one or more real world objects into the virtual reality scene; and
   resuming the virtual reality scene when it is determined that the criteria is no longer being met.

6. A method for modifying a virtual reality scene for display in a head mounted display (HMD), comprising:
   obtaining sensor data from sensors on the HMD, the sensors including eye gaze detectors and inertial sensors;
   processing the data for determining that a first criteria is met to transition from the virtual reality scene to an augmented virtual reality scene to be presented by the HMD, the first criteria corresponding to predetermined indicators that are suggestive of disorientation of a user when wearing the HMD and being presented the virtual reality scene; and
   inserting, based on said determining that the first criteria is met, a first real world object into the virtual reality scene, the first real world object being from a real world view provided by one or more cameras disposed in a virtual reality interactive space;
   wherein the first real world object is selected based on an expected reorientation effectiveness of said first real world object to reorient the user when wearing the HMD and being presented the virtual reality scene.

7. The method as recited in claim 6, wherein data from the sensors on the HMD are further obtained and processed for determining that the first criteria is still being met after the first real world object has been inserted into the virtual reality scene to provide the augmented virtual reality scene, wherein additional real world objects are progressively inserted until it is determined that the first criteria is no longer being met.

8. The method as recited in claim 6, wherein data from the sensors on the HMD are further obtained and processed for determining that a second criteria is met to switch the virtual reality scene to the real world view, the second criteria corresponding to predetermined indicators that are suggestive of disorientation of the user when wearing the HMD and being presented the virtual reality scene, wherein the switching includes fading out the virtual reality scene and fading in the real world view.

9. The method as recited in claim 6, wherein the first real world object is inserted at a location within the virtual reality scene that corresponds to a location that the first real world object is in the real world.

10. The method as recited in claim 6, wherein said determining that the first criteria is met further includes processing data associated with user settings, user history, or contextual information of the virtual reality scene.

11. The method as recited in claim 6, wherein the one or more cameras disposed in the virtual reality interactive space includes one or more front facing cameras of the HMD or one or more cameras disposed around the HMD.

12. The method as recited in claim 6, wherein the one or more cameras disposed in the virtual reality interactive space includes one or more HMD-facing cameras.

13. The method as recited in claim 6, wherein data is sensor data is further obtained from a plurality of photo-sensitive diodes (PSDs) of the HMD for said determining that the first criteria is met.

14. The method as recited in claim 6, wherein the virtual reality scene is paused or slowed once said determining is made that the first criteria is met.

15. The method as recited in claim 6, wherein when it is further determined that the first criteria is no longer being met after the first real world object has been inserted into the virtual reality scene to provide the augmented virtual reality scene, the augmented virtual reality scene is transitioned back to the virtual reality scene.

16. The method as recited in claim 6, wherein the first real world object includes an individual real world object and one or more grounding elements captured by the one or more cameras disposed in the virtual reality interactive space.

17. The method as recited in claim 6, wherein the first real world object includes a boundary condition such as a floor, a ceiling, or a wall, or portions thereof, the boundary condition captured by the one or more cameras disposed in the virtual reality interactive space.

18. The method as recited in claim 6, wherein a clip of the virtual reality scene is made shareable through the internet, the clip containing the virtual reality scene at a point within the virtual reality scene at which said determining that the first criteria is met is made.

19. A non-transitory computer readable storage medium storing a computer program executable by a processor based system, the computer program for modifying a virtual reality scene for display in a head mounted display (HMD), comprising:
    program instructions for obtaining data from sensors on the HMD, the sensors including inertial sensors;
    program instructions for processing the data for determining that a criteria is met to transition from the virtual reality scene to an augmented virtual reality scene to be presented by the HMD, the criteria corresponding to predetermined indicators that are suggestive of disorientation of a user when wearing the HMD and being presented the virtual reality scene;
    program instructions for overlaying, based on said determining that the criteria is met, at least part of a real world object onto the virtual reality scene, the real world object being present in a real world view captured by one or more cameras of the HMD;
    program instructions for determining that the criteria is still met after said overlaying and continuing to sequentially overlay additional real world objects as long as the criteria is till met.

20. A non-transitory computer readable storage medium in accordance with claim 19, further comprising:
    program instructions for discontinuing to overlay additional real world objects when it is determined that the criteria is no longer met, the one or more additional real world objects being present in the real world view captured by the one or more cameras of the HMD; and
    program instructions for transitioning the augmented virtual reality scene back to the virtual reality scene.

* * * * *